US012600148B2

(12) United States Patent

Eto et al.

(10) Patent No.: US 12,600,148 B2

(45) Date of Patent: Apr. 14, 2026

(54) INKJET RECORDING DEVICE

(71) Applicant: KYOCERA CORPORATION, Kyoto (JP)

(72) Inventors: Daisuke Eto, Kyoto (JP); Masahiro Higashitani, Kyoto (JP); Hiroatsu Tamai, Kyoto (JP); Masaaki Maruta, Kyoto (JP); Tomoya Hotani, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 167 days.

(21) Appl. No.: 18/254,382

(22) PCT Filed: Nov. 24, 2021

(86) PCT No.: PCT/JP2021/043034

§ 371 (c)(1),
(2) Date: May 25, 2023

(87) PCT Pub. No.: WO2022/114018

PCT Pub. Date: Jun. 2, 2022

(65) Prior Publication Data

US 2024/0025188 A1 Jan. 25, 2024

(30) Foreign Application Priority Data

Nov. 30, 2020 (JP) ................................ 2020-198123

(51) Int. Cl.
*B41J 2/21* (2006.01)
*B41J 11/00* (2006.01)

(52) U.S. Cl.
CPC .......... *B41J 11/0015* (2013.01); *B41J 2/2114* (2013.01); *B41J 2/2117* (2013.01)

(58) Field of Classification Search
CPC ..... B41J 2/2114; B41J 11/0015; B41J 2/2117; B41J 29/13; B41J 29/38
See application file for complete search history.

(56) References Cited

U.S. PATENT DOCUMENTS 6,439,708 B1 8/2002 Kato et al.
2010/0112497 A1 5/2010 Takabayshi et al.
(Continued)

FOREIGN PATENT DOCUMENTS

EP 1022151 A1 7/2000
EP 2181856 A1 * 5/2010 .......... B41M 5/0011
(Continued)

OTHER PUBLICATIONS

Translation of JP 2011-173252 A. (Year: 2011).*

*Primary Examiner* — Justin Seo

(74) *Attorney, Agent, or Firm* — HAUPTMAN HAM, LLP

(57) ABSTRACT

An inkjet recording device includes a conveyance unit, a carriage, one or a plurality of ink head lines, and a processing head. The processing head includes a preprocessing head arranged on an upstream side of the one or plurality of ink head lines in the conveyance direction and configured to eject a non-coloring preprocessing solution. In a case where a head arranged closest to one end in the main scanning direction is defined as a one-end side head, a head arranged closest to the other end is defined as an other-end side head, a distance from the one-end side head to the other-end side head in the main scanning direction is defined as LC, and a distance from the one-end side head to the preprocessing head in the main scanning direction is defined as B1, a relationship of |(B1−LC/2)|/LC≤1/4 is satisfied.

14 Claims, 19 Drawing Sheets

(56) References Cited

U.S. PATENT DOCUMENTS

| | | | |
|---|---|---|---|
| 2015/0328911 | A1 | 11/2015 | Garcia Maza et al. |
| 2019/0264056 | A1 | 8/2019 | Okuda et al. |
| 2020/0101782 | A1 | 4/2020 | Sekiguchi et al. |
| 2020/0276850 | A1 | 9/2020 | Urano et al. |

FOREIGN PATENT DOCUMENTS

| | | | | |
|---|---|---|---|---|
| JP | H10044388 | A | 2/1998 | |
| JP | 2010131975 | A | 6/2010 | |
| JP | 2011037228 | A | 2/2011 | |
| JP | 2011121315 | A | 6/2011 | |
| JP | 2011173252 | A | 9/2011 | |
| JP | 2013188962 | A | 9/2013 | |
| JP | 2017-024365 | A | 2/2017 | |
| JP | 2019147307 | A | 9/2019 | |
| JP | 2020-049834 | A | 4/2020 | |
| JP | 2020138454 | A | 9/2020 | |
| WO | WO-2022092171 | A1 * | 5/2022 | ................ B41J 2/15 |
| WO | WO-2022114009 | A1 * | 6/2022 | ............ B41J 2/2114 |

* cited by examiner

INKJET RECORDING DEVICE

RELATED APPLICATIONS

The present application is a National Phase of International Application Number PCT/JP2021/043034 filed Nov. 24, 2021, which claims the benefit of priority from Japanese Patent Application No. 2020-198123, filed on Nov. 30, 2020.

TECHNICAL FIELD

The present disclosure relates to an inkjet recording device including an ink head mounted on a carriage that moves in a main scanning direction.

BACKGROUND ART

An inkjet recording device such as an inkjet printer includes an ink head that ejects ink for image formation toward a recording medium. For example, in a case where a recording medium is a fiber sheet such as a woven fabric or a knitted fabric, or a plastic sheet, it may be necessary to apply a preprocessing solution and a postprocessing solution to the recording medium before and after ejecting ink toward the recording medium (e.g., Patent Literature 1). The preprocessing solution is, for example, a processing solution for improving fixability of ink to a recording medium and aggregability of an ink pigment. The postprocessing solution is, for example, a processing solution that enhances fastness of a printed image. In this case, the inkjet recording device includes a processing head that ejects the preprocessing solution and the postprocessing solution in addition to the ink head.

In a case where a recording medium has a wide width, the above described ink head and each processing head are mounted on a carriage that reciprocates in a main scanning direction. In recording processing, the recording medium is intermittently fed in a predetermined conveyance direction (sub-scanning direction), and the carriage is reciprocated in the main scanning direction while the recording medium is stopped. When the carriage moves, ink and a processing solution are ejected from the ink head and each processing head.

CITATION LIST

Patent Literature

Patent Literature 1: JP 2019-147307 A

SUMMARY OF INVENTION

An inkjet recording device according to one aspect of the present disclosure includes a conveyance unit, a carriage, one or a plurality of ink head lines, and a processing head. The conveyance unit is configured to convey a recording medium in a conveyance direction. The carriage is configured to reciprocate in a main scanning direction intersecting the conveyance direction. The one or plurality of ink head lines are located on the carriage at a position in the conveyance direction. The processing head is located on the carriage and is configured to eject a non-coloring processing solution. Each of the one or plurality of ink head lines includes a plurality of ink heads. The plurality of ink heads is arranged side by side in the main scanning direction and is configured to eject inks for image formation respectively. The processing head includes a preprocessing head. The preprocessing head is arranged on an upstream side of the one or plurality of ink head lines in the conveyance direction and is configured to eject a preprocessing solution as the processing solution. The preprocessing head is arranged to satisfy a relationship of Formula 1 in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the preprocessing head in the main scanning direction is defined as B1. $|(B1-LC/2)|/LC \leq 1/4$ . . . (Formula 1)

An inkjet recording device according to another aspect of the present disclosure includes a conveyance unit, a carriage, one or a plurality of ink head lines, and a processing head. The conveyance unit is configured to convey a recording medium in a conveyance direction. The carriage is configured to reciprocate in a main scanning direction intersecting the conveyance direction. The one or plurality of ink head lines are located on the carriage at a position in the conveyance direction. The processing head is located on the carriage and is configured to eject a non-coloring processing solution. The one or plurality of ink head lines includes a plurality of ink heads. The plurality of ink heads is arranged side by side in the main scanning direction and is configured to eject inks for image formation respectively. The processing head includes a postprocessing head. The postprocessing head is arranged on a downstream side of the one or plurality of ink head lines in the conveyance direction and is configured to eject a postprocessing solution as the processing solution. The postprocessing head is arranged to satisfy a relationship of Formula 2 in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the postprocessing head in the main scanning direction is defined as B2. $|(B2-LC/2)|/LC \leq 1/4$ . . . (Formula 2)

DESCRIPTION OF EMBODIMENT

In the following, an embodiment of the present disclosure will be described with reference to the drawings. In the present embodiment, as a specific example of an inkjet recording device, there will be illustrated an inkjet printer including an ink head that ejects ink for image formation on a wide and long recording medium. The inkjet printer of the present embodiment is suitable for digital textile printing in which images such as characters and patterns are printed on a recording medium made of fabric such as woven fabric and knitted fabric by an inkjet method. As a matter of course, the inkjet recording device according to the present disclosure is applicable also for printing various inkjet images on a recording medium such as a paper sheet or a resin sheet.

[Overall Configuration of Inkjet Printer]

Figure 1:
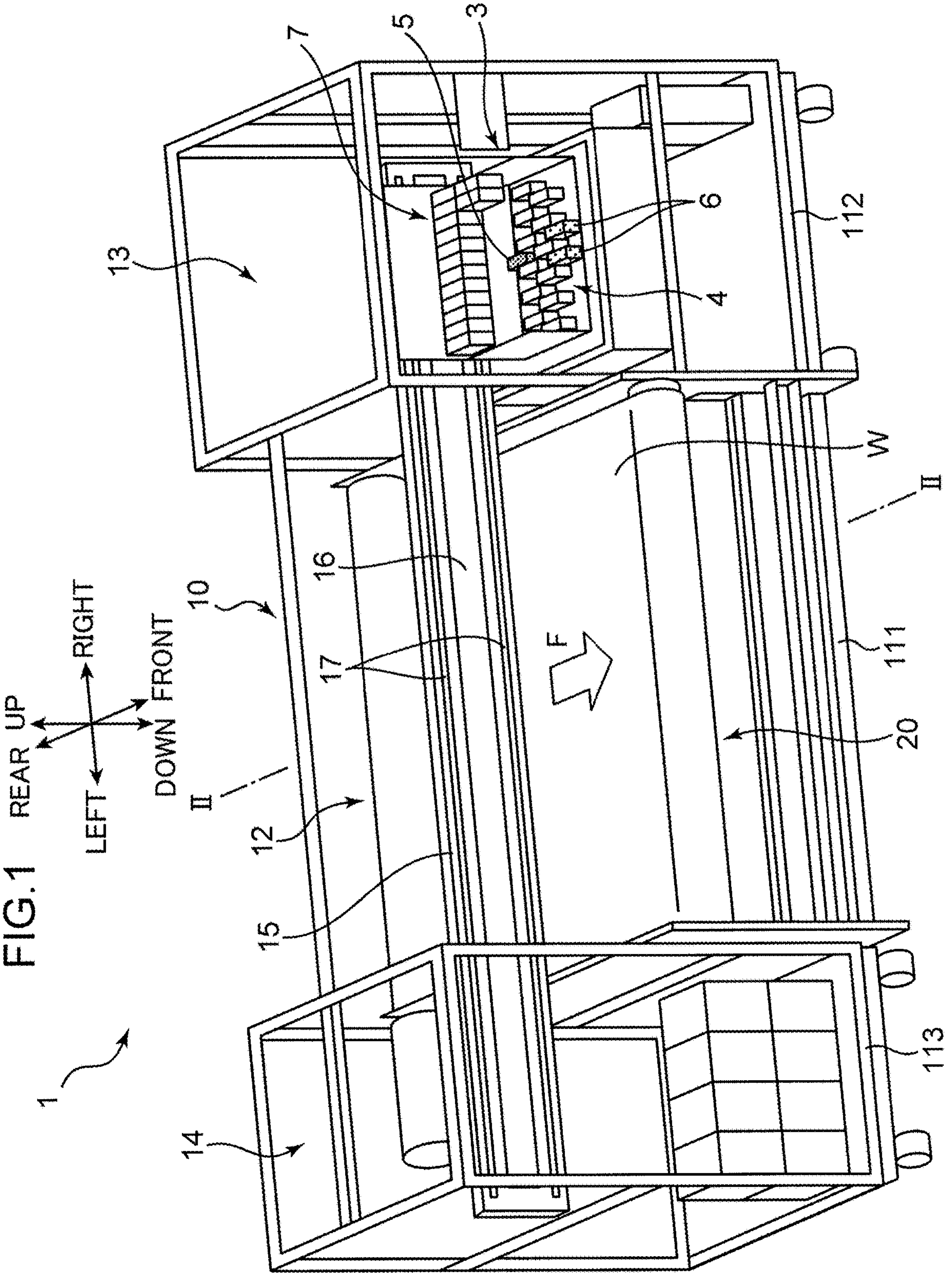
FIG. 1 is a perspective view illustrating an overall configuration of an inkjet printer according to an embodiment of the present disclosure.
Figure 2:
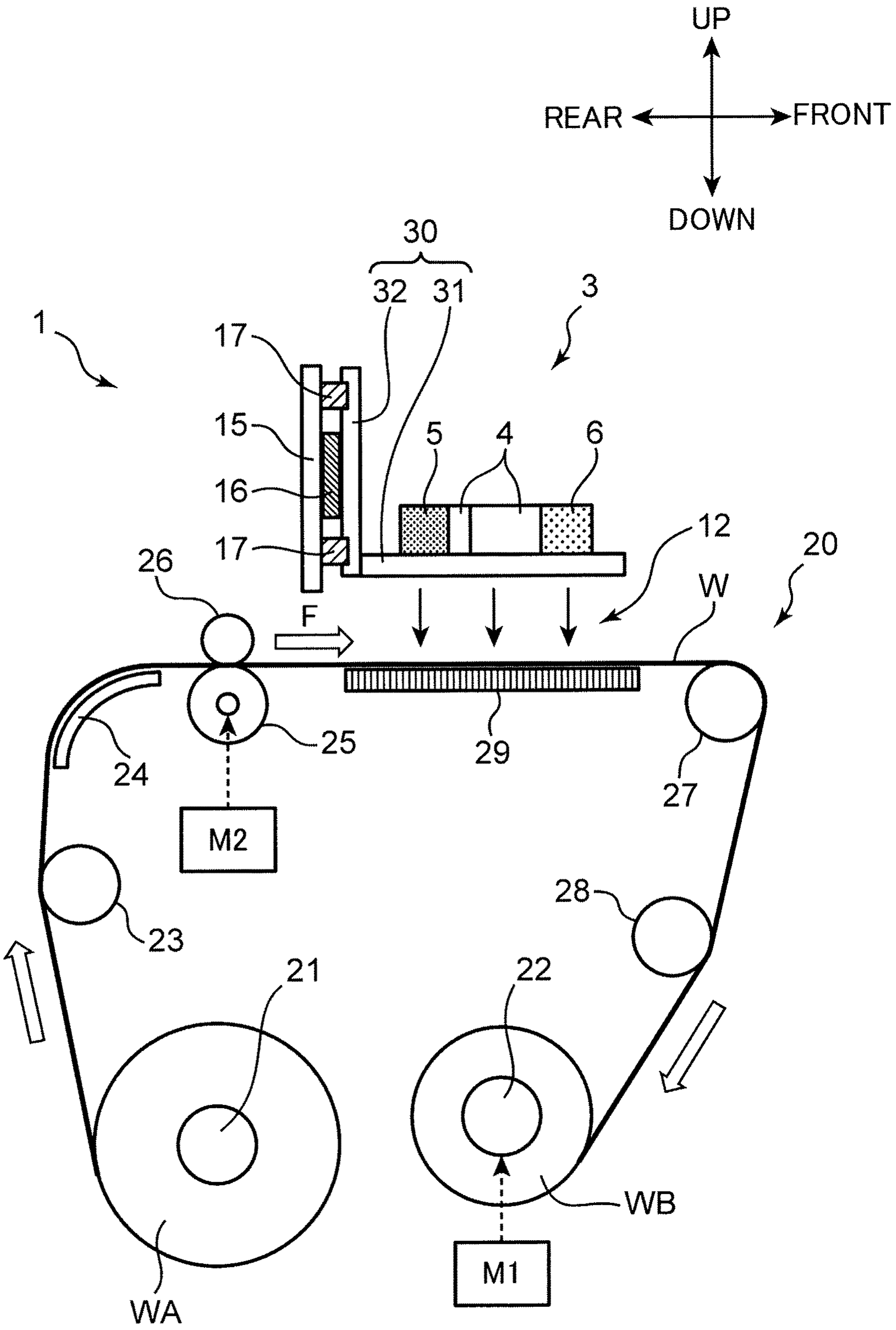
FIG. 2 is a schematic cross-sectional view taken along line II-II in FIG. 1.

FIG. 1 is a perspective view showing an overall configuration of an inkjet printer 1 according to the one embodiment of the present disclosure, and FIG. 2 is a schematic cross-sectional view taken along line II-II of FIG. 1. The inkjet printer 1 is a printer that prints an image on a wide and long workpiece W (recording medium) by an inkjet method, and includes a device frame 10, and a workpiece conveyance unit 20 (conveyance unit) and a carriage 3 incorporated in the device frame 10. In the present embodiment, a left-right direction is a main scanning direction at the time of printing on the workpiece W, and a direction from the rear toward the front is a sub-scanning direction (conveyance direction F of the workpiece W).

The device frame 10 forms a frame for mounting various constituent members of the inkjet printer 1. The workpiece conveyance unit 20 is a mechanism that intermittently feeds the workpiece W so that the workpiece W advances, in a printing region where inkjet printing processing is executed, in the conveyance direction F from the rear toward the front. The carriage 3 has mounted thereon an ink head 4, a preprocessing head 5, a postprocessing head 6, and a sub-tank 7, and reciprocates in the left-right direction during the inkjet printing processing.

The device frame 10 includes a center frame 111, a right frame 112, and a left frame 113. The center frame 111 forms a frame for mounting various constituent members of the inkjet printer 1, and has a left-right width corresponding to the workpiece conveyance unit 20. The right frame 112 and the left frame 113 stand on the right and left of the center frame 111, respectively. Between the right frame 112 and the left frame 113 is a printing area 12 in which printing processing is executed on the workpiece W.

The right frame 112 forms a maintenance area 13. The maintenance area 13 is an area where the carriage 3 is retracted when the printing processing is not executed. In the maintenance area 13, cleaning processing, purge processing, and the like of nozzles (ejection holes) of the ink head 4, the preprocessing head 5, and the postprocessing head 6 are executed, and a cap is fitted thereto. The left frame 113 forms a turnaround area 14 of the carriage 3. The turnaround area 14 is a region where the carriage 3 that has main-scanned the printing area 12 from the right side to the left side in the printing processing temporarily enters when executing main scanning in a reverse direction.

A carriage guide 15 for causing the carriage 3 to reciprocate in the left-right direction is assembled on an upper side of the device frame 10. The carriage guide 15 is a flat plate-shaped member elongated in the left-right direction, and is arranged above the workpiece conveyance unit 20. A timing belt 16 (moving member) is assembled to the carriage guide 15 so as to be able to circulate in the left-right direction (the main scanning direction). The timing belt 16 is an endless belt, and is driven to circulate in the left direction or the right direction by a drive source (not illustrated).

The carriage guide 15 is provided with a pair of upper and lower guide rails 17 so as to extend in parallel in the left-right direction, the upper and lower guide rails being holding members that hold the carriage 3. The carriage 3 is engaged with the guide rails 17. In addition, the carriage 3 is fixed to the timing belt 16. The carriage 3 moves in the left direction or the right direction along the carriage guide 15 while being guided by the guide rails 17 as the timing belt 16 circulates in the left direction or the right direction.

With reference mainly to FIG. 2, the workpiece conveyance unit 20 includes a feed roller 21 that draws out the workpiece W before printing and a take-up roller 22 that winds up the workpiece W after printing. The feed roller 21 is arranged at a lower rear part of the device frame 10, and is a winding shaft of a feed roll WA which is a winder of the workpiece W before printing. The take-up roller 22 is arranged at a lower front part of the device frame 10, and is a winding shaft of a winding roll WB which is a winder of the workpiece W after the printing processing. The take-up roller 22 is provided with a first motor M1 that rotationally drives the take-up roller 22 around an axis to execute winding operation of the workpiece W.

A path provided between the feed roller 21 and the take-up roller 22 and passing through the printing area 12 is a conveyance path of the workpiece W. In the conveyance path, a first tension roller 23, a workpiece guide 24, a conveyance roller 25, a pinch roller 26, a turnaround roller 27, and a second tension roller 28 are arranged in order from an upstream side. The first tension roller 23 applies a predetermined tension to the workpiece W on an upstream side of the conveyance roller 25. The workpiece guide 24 changes the conveyance direction of the workpiece W from upward to a front direction to bring the workpiece W into the printing area 12.

The conveyance roller 25 is a roller that generates a conveyance force for intermittently feeding the workpiece W in the printing area 12. The conveyance roller 25 is rotationally driven around an axis by a second motor M2 to intermittently convey the workpiece W in the front direction (predetermined conveyance direction F) so that the workpiece W passes through the printing area 12 (image forming position) opposed to the carriage 3. The pinch roller 26 is arranged so as to be opposed to the conveyance roller 25 from above, and forms a conveyance nip portion with the conveyance roller 25.

The turnaround roller 27 changes the conveyance direction of the workpiece W having passed through the printing area 12 from the front direction to downward, and guides the workpiece W after the printing processing to the take-up roller 22. The second tension roller 28 applies a predetermined tension to the workpiece W on a downstream side of the conveyance roller 25. A platen 29 is arranged in the printing area 12 below the conveyance path of the workpiece W.

The carriage 3 reciprocates in the main scanning direction (the left-right direction in the present embodiment) intersecting (orthogonal to, in the present embodiment) the conveyance direction F in a state of being cantilevered by the guide rails 17. The carriage 3 includes a carriage frame 30, and the ink head 4, the preprocessing head 5, the postprocessing head 6, and the sub-tank 7 mounted on the carriage frame 30. The carriage frame 30 includes a head support frame 31 and a back frame 32 (engagement portion).

The head support frame 31 is a horizontal plate that holds the above-described heads 4 to 6. The back frame 32 is a vertical plate extending upward from a rear end edge of the head support frame 31. As described above, the timing belt 16 is fixed to the back frame 32. In addition, the guide rails 17 are engaged with the back frame 32. In other words, in the present embodiment, the back frame 32 is the engagement portion held by the guide rails 17 in a cantilevered state. The head support frame 31 is a horizontal plate whose rear end side is cantilevered by the engagement portion.

The cantilevered state represents a state in which the engagement portion (back frame 32) is present in the carriage 3 only from the center to one side of the carriage 3, an upstream side or a downstream side, in the conveyance direction F, and no other engagement portion is present on the side opposite to the side where the engagement portion is present. The engagement portion is a portion held by the guide rails 17 which are the holding members. The engagement portion may be further arranged in a range other than the range in which the ink head 4 and the processing heads are arranged in the conveyance direction F. Specifically, the engagement portion may be arranged only on an upstream side or only on a downstream side with respect to the range in which the ink head 4 and the processing heads are arranged in the conveyance direction F.

[Details of Carriage]

Figure 3:
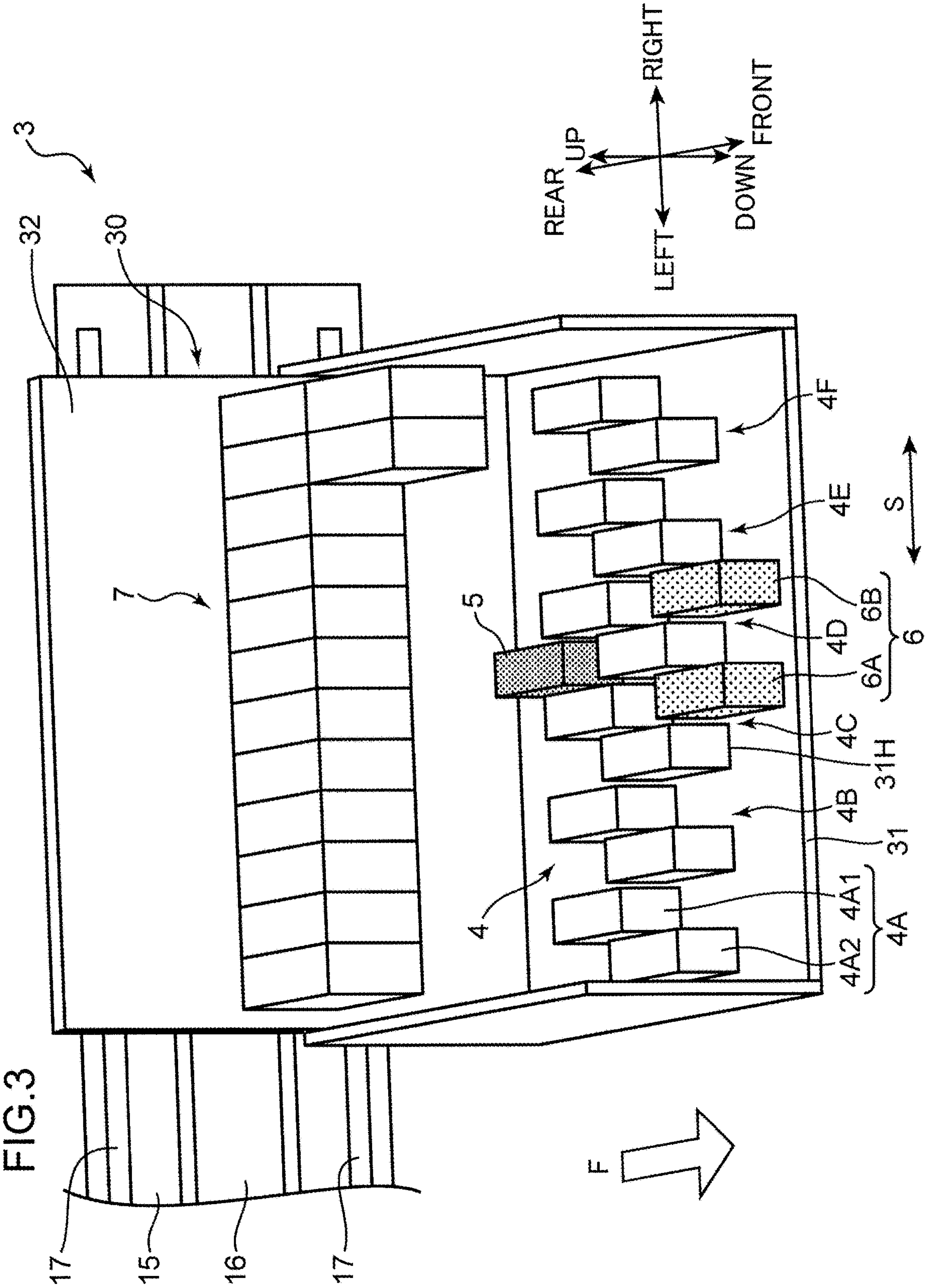
FIG. 3 is an enlarged perspective view of a carriage illustrated in FIG. 1.

The carriage 3 will be further described. FIG. 3 is an enlarged perspective view of the carriage 3 illustrated in FIG. 1. FIG. 3 illustrates the conveyance direction F (sub-scanning direction) of the workpiece W and a main scanning direction S which is a moving direction of the carriage 3. FIG. 3 shows an example in which a plurality of the ink heads 4 that eject ink for image formation to the workpiece W, the preprocessing head 5 and the postprocessing head 6 that eject non-coloring processing solutions, and a plurality of the sub-tanks 7 that supply the ink and the processing solutions to these heads 4 to 6 are mounted on the carriage 3.

Each of the ink heads 4 includes a large number of nozzles (ink ejection holes) that eject ink droplets by an ejection method such as a piezoelectric method using a piezoelectric element or a thermal method using a heating element, and an ink passage that guides the ink to the nozzles. As the ink, for example, an aqueous pigment ink containing an aqueous solvent, a pigment, and a binder resin can be used. The plurality of ink heads 4 in the present embodiment include first to sixth ink heads 4A to 4F that respectively eject inks of six different colors. For example, the first ink head 4A ejects an orange (second color) ink, the second ink head 4B ejects a green (second color) ink, the third ink head 4C ejects a yellow (first color) ink, the fourth ink head 4D ejects a red (first color) ink, the fifth ink head 4E ejects a blue (first color) ink, and the sixth ink head 4F ejects a black (second color) ink.

The ink heads 4A to 4F of the respective colors are mounted on the head support frame 31 of the carriage 3 so as to be aligned in the main scanning direction S. Each of the ink heads 4A to 4F for the respective colors has two heads. For example, the first ink head 4A is configured with an upstream side head 4A1 arranged on the upstream side in the conveyance direction F, and a downstream side head 4A2 arranged at a position downstream of the upstream side head 4A1 and shifted to the left side in the main scanning direction S. The same applies to the ink heads 4B to 4F of the other colors. The respective upstream side heads of the ink heads 4B to 4F are aligned in the main scanning direction S at the same position as the upstream side head 4A1 in the conveyance direction F, and the respective downstream side heads are aligned in the main scanning direction S at the same position as the downstream side head 4A2 in the conveyance direction F.

This arrangement causes the ink heads 4 that eject one color to be arranged in a cluster in the main scanning direction S. Specifically, all the ink heads 4 that are mounted on the carriage 3 to eject one color are arranged so as not to sandwich, in their middle in the main scanning direction S, the ink heads 4 that eject other colors. Furthermore, all the ink heads 4 that are mounted on the carriage 3 to eject one color may be arranged within a predetermined range in the main scanning direction S, and the ink heads 4 that eject other colors may not be arranged within the range.

In a case where there is a difference in a printing state such as a landing position and an ejection amount between the two ink heads 4, the difference is more likely to stand out in a case of ejecting the same color than in a case of ejecting different colors by the two ink heads 4. Arranging the ink heads 4 that eject the same color in a cluster in the main scanning direction S makes printed image quality be hardly degraded even when the ink heads 4 have different printing states.

Each of the preprocessing head 5 and the postprocessing head 6 is a type of processing head that ejects a non-coloring processing solution to be described later. The preprocessing head 5 and the postprocessing head 6 are arranged at positions different from the ink head 4 in the conveyance direction F. The preprocessing head 5 is arranged on the upstream side of the ink head 4 in the conveyance direction F. FIG. 3 shows the example in which one preprocessing head 5 is arranged in the vicinity of the center of an array of the ink heads 4. Similarly, the postprocessing head 6 is arranged on a downstream side of the ink head 4 in the conveyance direction F. FIG. 3 shows the example in which two postprocessing heads 6A and 6B (a plurality of the processing heads) are arranged to be aligned in the main scanning direction S in the vicinity of the center of the array of the ink heads 4. Various arrangement patterns of the ink head 4, the preprocessing head 5, and the postprocessing head 6 in the carriage 3 will be detailed in Examples 1 to 17 to be described later.

Note that as used in the above description, a series of the heads along the main scanning direction S configured by the ink head 4 and the postprocessing head 6 is referred to as a line of the heads or simply as a line. The line of the heads may include the preprocessing head 5. A series of the heads along the conveyance direction F configured by the ink head 4, the preprocessing head 5, and the postprocessing head 6 is referred to as a row of the heads or simply as a row.

The preprocessing head 5, which is a type of processing head, ejects a preprocessing solution for subjecting predetermined preprocessing to the workpiece W. The preprocessing solution is ejected from the preprocessing head 5 to a position of the workpiece W to which no ink has yet been ejected from the ink head 4. The preprocessing solution is a non-coloring processing solution that does not develop color even if it adheres to the workpiece W, and is, for example, a processing solution that exhibits a function of enhancing fixability of ink to the workpiece W, aggregability of an ink pigment, and the like. As such a preprocessing solution, a processing solution obtained by blending a binder resin in a solvent, a processing solution obtained by blending a cationic resin positively charged in a solvent, or the like can be used.

The postprocessing head 6, which is a type of processing head, ejects a postprocessing solution for subjecting predetermined postprocessing to the workpiece W to which ink has been adhered. The postprocessing solution is ejected from the postprocessing head 6 to a position of the workpiece W to which ink has been ejected from the ink head 4. Similarly, the postprocessing solution is a non-coloring processing solution that does not develop color even if it adheres to the workpiece W, and is a processing solution that exhibits a function of enhancing fixability and fastness (resistance to rubbing and scraping) of an ink image printed on the workpiece W by the ink head 4. As such a postprocessing solution, a silicone-based processing solution or the like can be used. Note that the postprocessing solution and the preprocessing solution are different processing solutions. Specifically, the postprocessing solution and the preprocessing solution contain different components.

Here, the non-coloring processing solution represents a processing solution that prevents a person from recognizing, with naked eyes, color development when the solution is printed alone on a recording medium. The color here includes black, white, gray, and the like having zero saturation. Although the non-coloring processing solution is basically a transparent liquid, for example, when one liter of the processing solution is viewed in a liquid state, the solution may appear slightly white or the like, not completely transparent. Since such color is very light, when the color is printed alone on a recording medium, a person cannot recognize with naked eyes that the color is developed. Although when a recording medium is printed with some type of processing solution alone, the recording medium might have a change such as generation of gloss, such a state is not considered color development.

In the present embodiment, the preprocessing solution and the postprocessing solution may be ejected onto substantially the entire surface of the workpiece W, or the preprocessing solution and the postprocessing solution may be selectively ejected in accordance with an image to be printed, similarly to ink.

Subsequently, a case where the preprocessing solution and the postprocessing solution are selectively ejected will be described. As described above, the preprocessing solution, the ink, and the postprocessing solution are ejected in this order to a part of the workpiece W where the color is printed in accordance with an image. In this case, the ink may be of one color or of a plurality of colors. Basically, neither the preprocessing solution nor the postprocessing solution is ejected to a part where no color is printed, i.e., a part to which no ink is ejected. In order to adjust image quality of an image to be printed, texture of the workpiece W, and the like, a part of ejections of the preprocessing solution and the postprocessing solution may be selected in a manner different from that of ejection of the ink.

Openings 31H are provided at head arrangement positions on the head support frame 31. The ink heads 4A to 4F, the preprocessing head 5, and the postprocessing head 6 are assembled to the head support frame 31 so as to be fitted into the respective openings 31H. A nozzle arranged on a lower end surface of each of the heads 4, 5, and 6 is exposed from each opening 31H.

The sub-tank 7 is supported in the carriage 3 at a position above the heads 4, 5, and 6 via a holding frame (not illustrated). The sub-tank 7 is provided corresponding to each of the heads 4, 5, and 6. Ink or a processing solution (not illustrated) is supplied to each sub-tank 7 from a cartridge or a main tank in which the ink and the processing solution are stored. Each sub-tank 7 supplies the ink or the processing solution to each of the heads 4, 5, and 6. Each of the sub-tanks 7 and the heads 4, 5, and 6 are connected by a pipeline (P1, P2, P3 illustrated in FIG. 24) not illustrated in FIG. 3.

As described in the foregoing, the inkjet printer 1 according to the present embodiment is an all-in-one printer in which the three types of heads, the ink head 4, the preprocessing head 5, and the postprocessing head 6 are mounted on one carriage 3. According to the inkjet printer 1, for example, in a printing step of executing inkjet printing on fabric in digital textile printing, a step of ejecting the preprocessing solution and a step of ejecting the postprocessing solution can be executed integrally. Therefore, a textile printing step can be simplified, and a textile printing device can be made compact.

[Printing Method]

Figure 4:
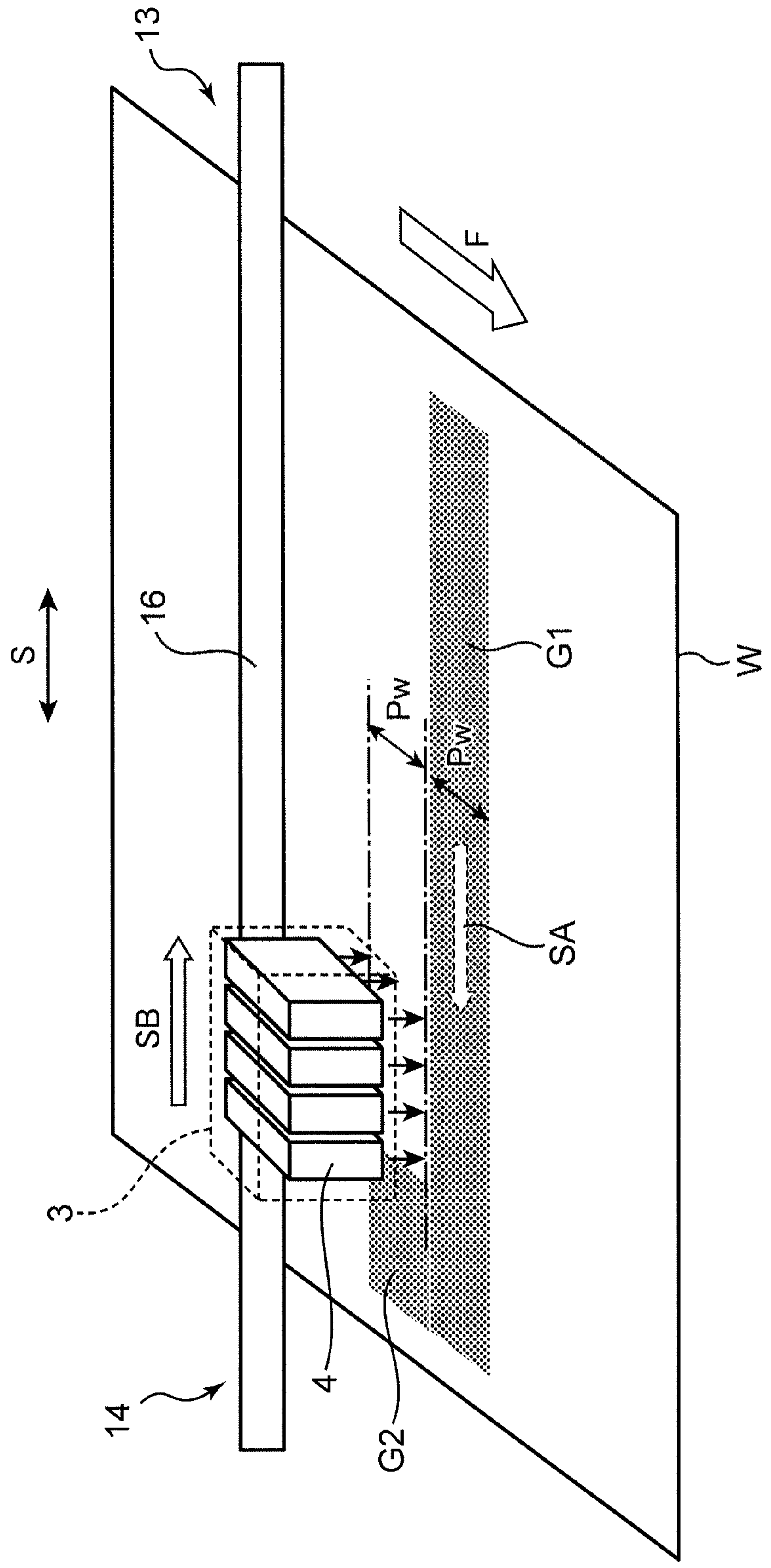
FIG. 4 is a schematic view illustrating a serial printing method adopted in the present embodiment.

Subsequently, a printing method executed by the inkjet printer 1 according to the present embodiment will be described. The inkjet printer 1 performs the printing processing on the workpiece W by a serial printing method. FIG. 4 is a schematic view illustrating the serial printing method. In FIG. 4, the carriage 3 is simply drawn without the preprocessing head 5 and the postprocessing head 6.

In a case where the workpiece W has a size with a large width, printing cannot be performed while continuously feeding the workpiece W. The serial printing method is a printing method of repeating reciprocating movement, in the main scanning direction S, of the carriage 3 on which the ink heads 4 of the respective colors are mounted and intermittent feeding of the workpiece W in the conveyance direction F. Here, it is assumed that the ink head 4 has a predetermined print width Pw in the conveyance direction F. The print width Pw is substantially equal to an array range of ink ejection nozzles of the ink heads 4.

Figure 5A:
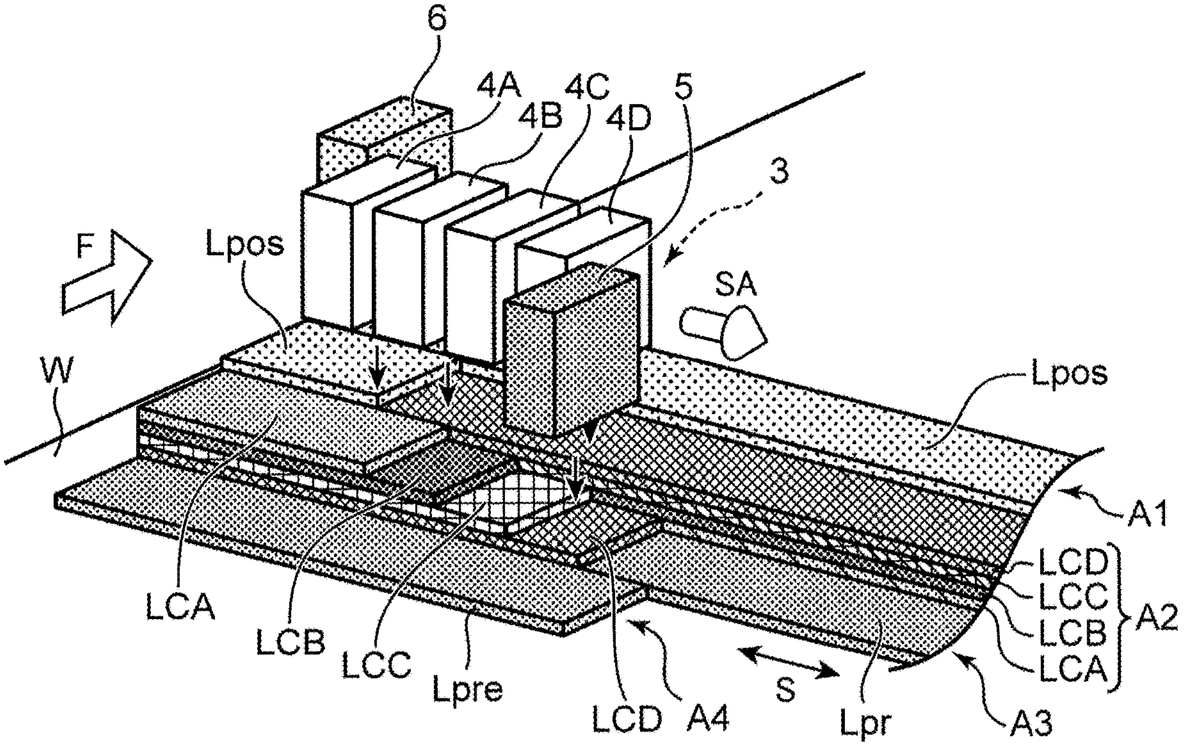
FIG. 5A is a schematic view illustrating a printing state in a forward path and a backward path of the carriage.
Figure 5B:
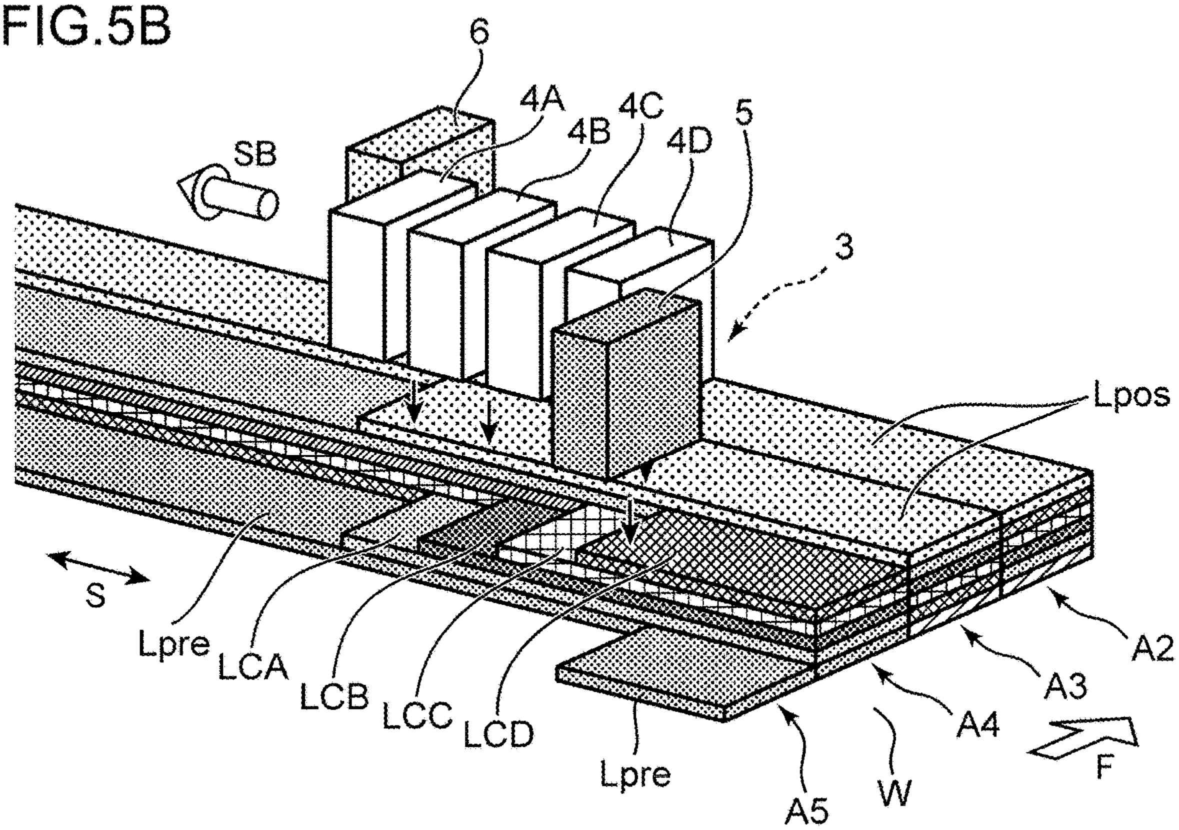
FIG. 5B is a schematic view illustrating a printing state in the forward path and the backward path of the carriage.

In FIG. 4, and FIG. 5A and FIG. 5B to be described below, a width of each head in the conveyance direction F and the print width Pw are drawn substantially equal. In practice, the width of each head in the conveyance direction F is larger than the print width Pw and the array range of the ejection nozzles.

FIG. 4 illustrates a state in which the carriage 3 has moved in a forward direction SA in the main scanning direction S and printing of a band-shaped image G1 having the print width Pw is completed. At the time of main scanning in the forward direction SA, the feeding of the workpiece W is stopped. After the band-shaped image G1 is printed, the workpiece W is fed in the conveyance direction F by a pitch corresponding to the print width Pw. At this time, the carriage 3 waits in the turnaround area 14 on a left end side. After the feeding of the workpiece W, the carriage 3 turns around in a backward direction SB along with reverse movement of the timing belt 16. The workpiece W is in a stopped state. Then, as illustrated in FIG. 4, the carriage 3 prints a band-shaped image G2 having the print width Pw on an upstream side of the band-shaped image G1 while moving in the backward direction SB. Hereinafter, the same operation is repeated.

FIGS. 5A and 5B are schematic views illustrating a printing state on the forward path and the backward path of the carriage 3. Here, the ink head 4, the preprocessing head 5, and the postprocessing head 6 mounted on the carriage 3 are simply illustrated. The ink head 4 includes the first, second, third, and fourth ink heads 4A, 4B, 4C, and 4D for ejecting inks of first, second, third, and fourth colors different from each other. The first to fourth ink heads 4A to 4D are aligned in the main scanning direction S. The preprocessing head 5 is arranged upstream and the postprocessing head 6 is arranged downstream, respectively, of the ink head 4 in the conveyance direction F. Similarly to the case described with reference to FIG. 4, the workpiece W is fed in the conveyance direction F at a time between the forward printing and the backward printing. A moving distance in the conveyance direction F at this time is an interval pitch (head pitch) between adjacent heads in the conveyance direction F. The moving distance is also the print width of each of the heads 4, 5, 6.

FIG. 5A illustrates a state in which while moving in the forward direction SA in the main scanning direction S, the carriage 3 is performing printing operation (forward main scanning). A region A4 on the workpiece W is a region to which the preprocessing head 5 mounted on a most upstream side of the carriage 3 is opposed. In the forward main scanning this time, a preprocessing layer Lpre is formed on the region A4 by the preprocessing solution ejected from the preprocessing head 5.

A region A3 is a region located downstream of the region A4 by one head pitch, and is a region to which the ink head 4 is opposed. On the region A3, the preprocessing layer Lpre has already been formed over the entire length in the main scanning direction by backward main scanning last time. In the forward main scanning this time, first, second, third, and fourth ink layers LCA, LCB, LCC, and LCD are formed on the preprocessing layer Lpre in the region A3 by the inks of the first to fourth colors sequentially ejected in the order of arrangement of the first to fourth ink heads 4A to 4D. Although in FIG. 5A, the fourth to first ink layers LCD to LCA are illustrated to be sequentially laminated for easy understanding, the ink layers are not actually laminated. Note that the above-described preprocessing layer Lpre and a postprocessing layer Lpos to be described later are not formed on the workpiece W.

A region A2 is a region located downstream of the region A3 by one head pitch, and is a region to which the postprocessing head 6 mounted on a most downstream side of the carriage 3 is opposed. On the region A2, the preprocessing layer Lpre by the forward main scanning last time and the first to fourth ink layers LCA to LCD by the backward main scanning last time have been already formed over the entire length in the main scanning direction. In the forward main scanning this time, the postprocessing layer Lpos is formed on the first to fourth ink layers LCA to LCD in the region A2 by the postprocessing solution ejected from the postprocessing head 6.

A region A1 is a region downstream of the region A2 by one head pitch, and is a region through which the carriage 3 has passed and the printing processing is completed. In other words, in the region A1, the preprocessing layer Lpre, the first to fourth ink layers LCA to LCD, and the postprocessing layer Lpos are formed over the entire length in the main scanning direction.

FIG. 5B illustrates a state in which after the forward main scanning shown in FIG. 5A is finished, the carriage 3 turns around to perform the backward main scanning while moving in the backward direction SB. Before the turnaround movement, the workpiece W is fed in the conveyance direction F by one head pitch. A region A5 on the workpiece W is a region located upstream of the region A4 by one head pitch, and is a region to which the preprocessing head 5 is opposed in the backward main scanning this time. The preprocessing layer Lpre is formed on the region A5 by the preprocessing solution ejected from the preprocessing head 5.

In the region A4 and the region A3, the first to fourth ink layers LCA to LCD and the postprocessing layer Lpos are formed on the existing layers, respectively. Specifically, in the region A4, the first to fourth ink layers LCA to LCD are formed on the preprocessing layer Lpre. In the region A3, the postprocessing layer Lpos is formed on the first to fourth ink layers LCA to LCD. The region A2 is a region where the printing processing is completed subsequently to the region A1.

The reason why the printing processing can be performed in both the forward main scanning and the backward main scanning as described above is that the preprocessing head 5 and the postprocessing head 6 are shifted with respect to the ink head 4 in the conveyance direction F. If the preprocessing head 5, the ink head 4, and the postprocessing head 6 are aligned in this order on the carriage 3 in the main scanning direction S, printing processing enabling the preprocessing solution and the postprocessing solution to be ejected in a desirable landing order can be realized only in one of the forward main scanning and backward main scanning. In order to enable printing processing in two ways, a pair of the preprocessing head 5 and the postprocessing head 6 needs to be arranged on both sides of the array of the ink heads 4. In this case, a width of the carriage 3 in the main scanning direction S is increased. Since such arrangement is unnecessary in the present embodiment, the width of the carriage 3 in the main scanning direction S can be reduced.

When the ink heads 4 are set to have a plurality of lines, an amount of ink to be landed on the workpiece W can be increased. For example, when there are two lines of the ink heads 4, printing can be performed as follows. After the first to fourth ink layers LCA to LCD are formed by the ink head 4 in the first line as described above, the workpiece W is conveyed in the conveyance direction F by one head pitch, and the first to fourth ink layers LCA to LCD are formed by the ink head 4 in the second line. In this manner, ink of each color can be printed for two layers on the workpiece W.

[Various Modes of Head Arrangement]

In the following, various arrangement examples of the ink head 4, the preprocessing head 5, and the postprocessing head 6 on the carriage 3 will be illustrated as Examples 1 to 11. Note that FIGS. 1 to 5A and 5B described above are for the purpose of describing the basic functions of the preprocessing head 5 and the postprocessing head 6, and detailed arrangement of the preprocessing head 5 and the postprocessing head 6 according to the present embodiment will be described below with reference to FIG. 6 and subsequent drawings.

Example 1

Figure 6:
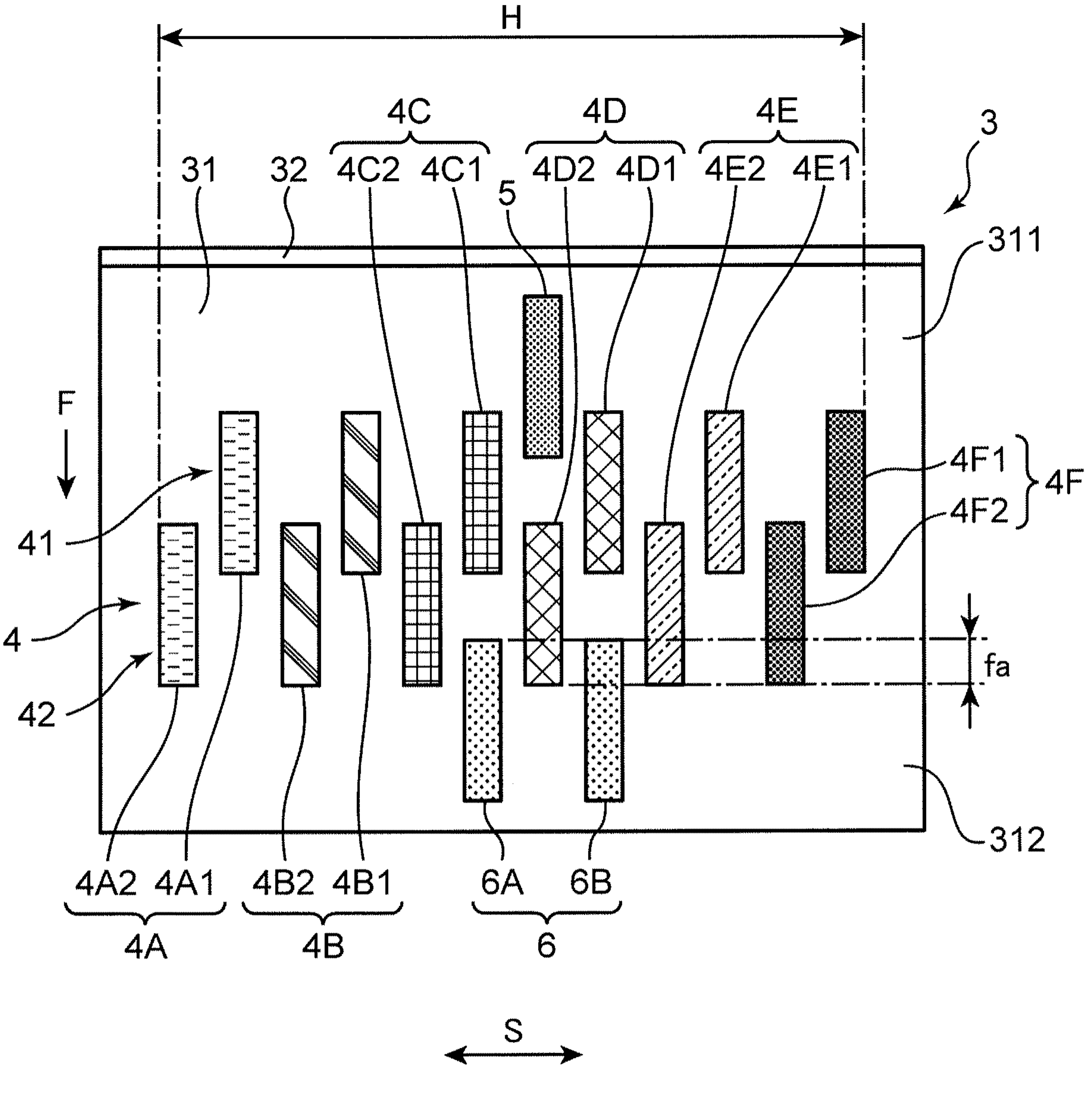
FIG. 6 is a plan view schematically illustrating head arrangement according to Example 1, the view showing arrangement of an ink head and a processing head in the carriage illustrated in FIG. 3.

FIG. 6 is a plan view schematically showing head arrangement according to Example 1. FIG. 6 is a view showing arrangement of the ink head 4, the preprocessing head 5, and the postprocessing head 6 (the plurality of processing heads) in the carriage 3 shown in FIG. 3. The carriage 3 is supported in the cantilevered state at the back frame 32 (engagement portion) by the guide rail 17. The back frame 32 is arranged on the upstream side in the conveyance direction F of the head support frame 31. In the conveyance direction F, a side of the head support frame 31 on which the back frame 32 is arranged is referred to as a proximal end side 311, and a side of the head support frame 31 opposite to the proximal end side 311 is referred to as a distal end side 312. As described above, on the head support frame 31 of the carriage 3, the first to sixth ink heads 4A to 4F that respectively eject the inks of the six different colors, the preprocessing head 5, and the postprocessing head 6 are mounted. Each of the ink heads 4A to 4F of the respective colors includes two unit heads (12 in total). While the number of the preprocessing heads 5 is one, two postprocessing heads 6 are provided.

Groups of the first to sixth ink heads 4A to 4F constituting the ink head 4 are arrayed so as to be aligned in the main scanning direction S in a central region in the conveyance direction F of the head support frame 31. The preprocessing head 5 is arranged, in a substantially central portion of the carriage 3 in the main scanning direction S, on the upstream side of the ink head 4 in the conveyance direction F, and on the proximal end side 311 of the head support frame 31. On the other hand, the postprocessing head 6 is arranged, in the substantially central portion of the carriage 3 in the main scanning direction S, on the downstream side of the ink head 4 in the conveyance direction F, and on the distal end side 312 of the head support frame 31. The preprocessing head 5 and the postprocessing head 6 are both arranged near a central portion of the head support frame 31 in the main scanning direction S.

The first ink head 4A includes the upstream side head 4A1, and the downstream side head 4A2 arranged downstream of the upstream side head 4A1. In other words, the upstream side head 4A1 and the downstream side head 4A2 are arrayed in the conveyance direction F. An arrangement position of the upstream side head 4A1 is a position closer to the proximal end side 311 in the central region of the head support frame 31. An arrangement position of the downstream side head 4A2 is a position closer to the distal end side 312 in the central region of the head support frame 31. The downstream side head 4A2 is arranged at a position shifted to one side (left side) in the main scanning direction S with respect to the upstream side head 4A1, and is arranged at a position partially overlapping with the upstream side head in the conveyance direction F. As a matter of course, the upstream side head 4A1 and the downstream side head 4A2 may be arrayed at the same position in the main scanning direction S (the position at which the heads are linearly aligned in the conveyance direction F). The arrangement of the present example, however, enables more reduction in a size of the carriage 3 in the conveyance direction F.

The second to sixth ink heads 4B to 4F also include upstream side heads 4B1, 4C1, 4D1, 4E1, and 4F1 and downstream side heads 4B2, 4C2, 4D2, 4E2, and 4F2, respectively, which are similar to the upstream side head 4A1 and the downstream side head 4A2 described above. The upstream side heads 4A1 to 4F1 of the first to sixth ink heads 4A to 4F are aligned at the same position in the conveyance direction F and at predetermined intervals in the main scanning direction S. The downstream side heads 4A2 to 4F2 are also aligned at the same position in the conveyance direction F and at predetermined intervals in the main scanning direction S. As a result, a staggered arrangement mode is formed in which parts of the downstream side heads 4A2 to 4F2 are interposed between arrangement pitches of the upstream side heads 4A1 to 4F1, respectively.

In other words for the configuration of the ink head 4, the ink head 4 has a plurality of ink head lines mounted on the carriage 3 so as to be aligned in the conveyance direction F. Each of the plurality of ink head lines includes a plurality of ink heads that are arranged side by side in the main scanning direction S and eject inks for image formation. In the example shown in FIG. 6, the plurality of ink head lines includes a first ink head line 41 and a second ink head line 42. The ink heads included in the first ink head line 41 are the upstream side heads 4A1, 4B1, 4C1, 4D1, 4E1, and 4F1. The ink heads included in the second ink head line 42 are the downstream side heads 4A2, 4B2, 4C2, 4D2, 4E2, and 4F2.

The preprocessing head 5 is arranged so as to be partially interposed between a pair of adjacent ink heads in the main scanning direction S. Specifically, the preprocessing head 5 has a positional relationship having its downstream portion interposed between the upstream side head 4C1 of the third ink head 4C and the upstream side head 4D1 of the fourth ink head 4D.

The postprocessing head 6 includes a first postprocessing head 6A and a second postprocessing head 6B arranged side by side in the main scanning direction S. FIG. 6 shows the example in which the first postprocessing head 6A and the second postprocessing head 6B are arranged at the same position in the conveyance direction F and side by side at predetermined intervals in the main scanning direction S. The first postprocessing head 6A is arranged so as to have its upstream side portion interposed between the downstream side head 4C2 of the third ink head 4C and the downstream side head 4D2 of the fourth ink head 4D. The second postprocessing head 6B is arranged so as to have its upstream side portion interposed between the downstream side head 4D2 and the downstream side head 4E2 and is arranged at the same position as the upstream side head 4D1 in the main scanning direction S. With this arrangement, the first and second postprocessing heads 6A and 6B are set to have an arrangement relationship having an overlapping region fa with the downstream side heads 4C2, 4D2, and 4E2 in the conveyance direction F.

In the conveyance direction F, a width of each head is larger than the print width Pw and the array range of the ejection nozzles. Therefore, each head is arranged to have the overlapping region fa in order not to have a space between the print range Pw of the head in each line and the print range Pw of the head in an adjacent line.

Unless otherwise specified, in the drawings including FIG. 6, an interval between the heads adjacent to each other in the main scanning direction S (an interval between the centers of the heads) is the same. Similarly, an interval between adjacent heads in the conveyance direction F (an interval between the centers of the heads) is the same.

As a result of the head arrangement described above, the preprocessing head 5 and the postprocessing head 6 are arranged within a range of an arrangement width H of the ink head 4 in the main scanning direction S. The ink head 4 has the arrangement width H between the downstream side head 4A2 of the first ink head 4A and the upstream side head 4F1 of the sixth ink head 4F in the main scanning direction S. The preprocessing head 5 is arranged on the upstream side of the ink head 4 within the range of the arrangement width H, and the postprocessing head 6 is arranged on the downstream side of the ink head 4 within the range of the arrangement width H. In particular, in Example 1, the preprocessing head 5 and the postprocessing head 6 are located at a substantially central portion in the main scanning direction S of an array of all the heads.

According to the head arrangement according to Example 1 described above, it is possible to increase ejection amounts of necessary ink and processing solution while reducing the size of the carriage 3. In other words, the preprocessing head 5 and the postprocessing head 6 are arranged at positions different from the ink head 4 in the conveyance direction F. With this configuration, a width of the carriage in the main scanning direction necessary for mounting the heads 4 to 6 can be shortened while arraying the ink heads 4A to 4F that enable an increase in an ejection amount of a necessary ink in the main scanning direction S and while enabling the printing processing in both the forward main scanning and the backward main scanning. Furthermore, the postprocessing head 6 is configured with the plurality of first and second postprocessing heads 6A and 6B, which are arranged side by side in the main scanning direction S. Therefore, even when an ejection amount of the postprocessing solution is insufficient with a single head, a necessary amount can be ejected by arranging the plurality of postprocessing heads 6A and 6B.

The first to sixth ink heads 4A to 4F include the upstream side heads 4A1 to 4F1 (the first ink head line 41) and the downstream side heads 4A2 to 4F2 (the second ink head line 42) arrayed in the conveyance direction F (the direction intersecting an array direction of the plurality of processing heads), respectively. Therefore, even if the number of the ink heads 4 is increased in order to increase the ejection amount of the ink of each color or to achieve multicoloring, it is possible to make the width of the carriage 3 in the main scanning direction be hardly increased.

The preprocessing head 5 and the postprocessing head 6 are arranged within the range of the arrangement width H of the first to sixth ink heads 4A to 4F in the main scanning direction S. Therefore, even when the preprocessing head 5 and the postprocessing head 6 are mounted on the carriage 3 in addition to the ink head 4, it is not necessary to extend the width of the carriage 3 in the main scanning direction. In other words, it is possible to make the width of the carriage 3 in the main scanning direction be hardly increased.

The preprocessing head 5 and the postprocessing head 6 are arranged so as to have a part thereof interposed between the array pitches of the first to sixth ink heads 4A to 4F. Focusing on the first postprocessing head 6A, a part of the first postprocessing head 6A is interposed between the pair of downstream side heads 4C2 and 4D2. Such staggered arrangement enables the ink head 4 and the processing heads 5 and 6 arranged at different positions in the conveyance direction F to be arranged at high density in the conveyance direction F. Accordingly, the width of the carriage 3 in the conveyance direction F can be reduced.

In the head arrangement of Example 1, one preprocessing head 5 is arranged on the upstream side of the ink head 4 in the conveyance direction F, and two postprocessing heads 6A and 6B are arranged on the downstream side. In other words, it is possible to provide the all-in-one inkjet printer 1 in which three kinds of heads for the preprocessing solution, the ink, and the postprocessing solution are mounted on one carriage 3. In addition, since the preprocessing head 5, the ink head 4, and the postprocessing head 6 are sequentially arranged in the conveyance direction F, the preprocessing solution, the ink, and the postprocessing solution can be ejected in a desirable landing order in both the forward main scanning and the backward main scanning.

The carriage 3 has the back frame 32 (engagement portion) that is held in the cantilevered state by the guide rails 17 (holding members) (FIG. 1). The structure can be simplified by cantilevering the carriage 3 by the timing belt 16. In addition, cantilevering easily realizes a structure in which a downstream side of the carriage 3 is opened, and facilitates maintenance of the ink head 4 and the processing heads 5 and 6.

In thus cantilevered carriage 3, the preprocessing head 5 is arranged on the proximal end side 311 (the side close to the engagement portion) of the head support frame 31, and the postprocessing head 6 is arranged on the distal end side 312 (the side far from the engagement portion). Unlike the proximal end side 311 close to the back frame 32 fixed to the timing belt 16, it is assumed that positional accuracy inevitably decreases on the distal end side 312 which is a free end. However, on the distal end side 312, there is mounted the postprocessing head 6 that is not relatively required to be highly severe in ejection accuracy. Since the postprocessing solution serves for coating an ink image printed on the workpiece W, even when the landing position deviates, a relative degree of influence on image quality can be reduced as compared with a case where the preprocessing solution has the same degree of landing position deviation. Accordingly, even when the cantilevered carriage 3 is used, it is possible to make image quality hardly deteriorate.

<Problems in Head Arrangement>

As described above, when the preprocessing head 5 that ejects the preprocessing solution and the postprocessing head 6 that ejects the postprocessing solution are mounted on the carriage 3 in addition to the ink head 4, and the preprocessing solution, the ink, and the postprocessing solution are sequentially ejected to the workpiece W as the carriage 3 reciprocates in the main scanning direction, there occurs a problem that time from landing of the preprocessing solution to landing of the ink and time from landing of the ink to landing of the postprocessing solution vary depending on an image position in the main scanning direction S, resulting in causing image quality to be liable to vary on the workpiece W.

For example, in a case of using a preprocessing solution that enhances aggregability of an ink pigment, color development becomes deeper as the time from the landing of the preprocessing solution to the landing of the ink becomes longer. Furthermore, for example, in a case of using a postprocessing solution that enhances fastness, color development becomes deeper as the time from the landing of the ink to the landing of the postprocessing solution becomes longer. In a case of printing using these solutions, the color development becomes deeper as the time from the landing of the preprocessing solution to the landing of the postprocessing solution becomes longer. In a case where the ink of the same color is landed a plurality of times, with respect to the preprocessing solution, time from landing of the preprocessing solution to first landing of the ink after the landing of the preprocessing solution has a relatively large influence on the color development density. With respect to the postprocessing solution, time from landing of the postprocessing solution to landing of the ink that landed last before the landing of the postprocessing solution has a relatively large influence on the color development density.

In order to solve the above problems, the inventors of the present disclosure have newly found that by appropriately setting the arrangement of the preprocessing head 5 and the postprocessing head 6 on the carriage 3, it is possible to reduce a variation in time from landing of the preprocessing solution to landing of the ink and a variation in time from landing of the ink to landing of the postprocessing solution even with respect to different image positions in the main scanning direction S. A concept of the head arrangement and an arrangement example (Example) thereof on the basis of such new focusing point will be described below.

<Concept of Head Arrangement>

Figure 7:
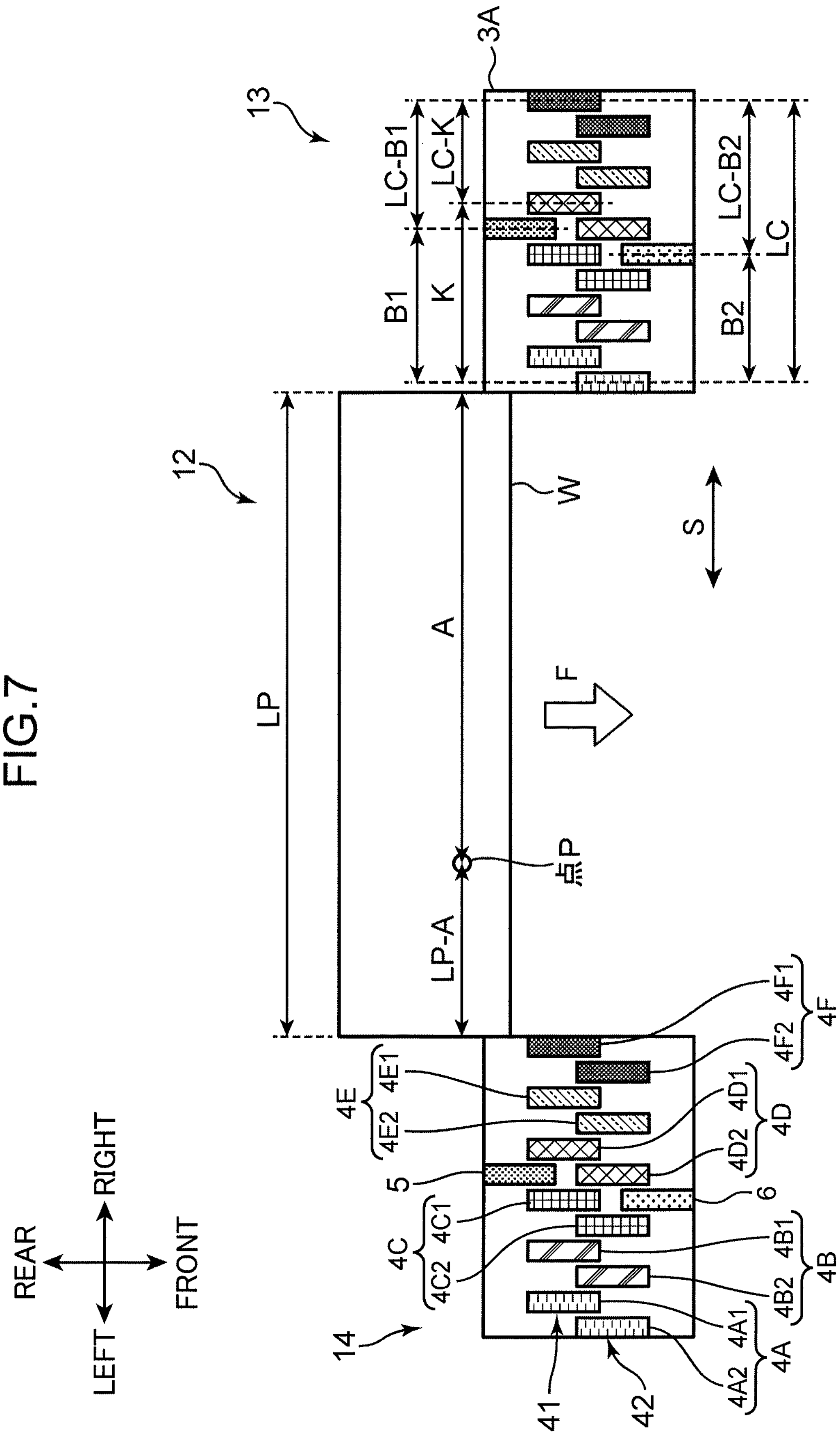
FIG. 7 is a schematic view for explaining landing time of a preprocessing solution, ink, and a postprocessing solution at a point P on a recording medium.

FIG. 7 is a schematic view for explaining landing time of the preprocessing solution, the ink, and the postprocessing solution at a point P on the workpiece W. In FIG. 7, the printing area 12 is arranged in the central portion, and the maintenance area 13 and the turnaround area 14 are arranged on both the left and right sides thereof. As described above, when the carriage 3 moves along the main scanning direction S between the maintenance area 13 and the turnaround area 14, the ink, the preprocessing solution, and the postprocessing solution are ejected from the ink head 4, the preprocessing head 5, and the postprocessing head 6 to the workpiece W, respectively. In FIG. 7, the carriage 3 is illustrated in both the maintenance area 13 and the turnaround area 14 for the sake of explanation. In the following, description will be made of a case where the ink head 4 has a plurality of ink head lines, and printing is performed while the workpiece W is intermittently fed at one head pitch (the interval pitch between adjacent heads in the conveyance direction F) as an example.

In FIG. 7, among the plurality of ink heads included in the plurality of ink head lines 41 and 42, and the processing heads (the preprocessing head 5 and the postprocessing head 6), a head arranged closest to one end in the main scanning direction S is defined as a one-end side head, a head arranged closest to another end is defined as the other-end side head, a distance from the one-end side head to the other-end side head in the main scanning direction S is defined as LC, a distance from the one-end side head to the preprocessing head 5 in the main scanning direction S is defined as B1, a distance from the one-end side to a predetermined ink head (the upstream side head 4D1 of the fourth ink head 4D in FIG. 7) in the main scanning direction S is defined as K, and a distance from the one-end side head to the postprocessing head 6 in the main scanning direction S is defined as B2. In the example shown in FIG. 7, the one-end side head is the downstream side head 4A2 of the first ink head 4A, and the other-end side head is the upstream side head 4F1 of the sixth ink head 4F. Although the distances LC, K, B1, and B2 may be set on the basis of a part of the respective heads, the following description will be made of a mode where each distance described above is set on the basis of the center of each head in the main scanning direction S. The one-end side head and the other-end side head may be reversed.

Note that basically, the center of the head in the main scanning direction S is a position of a virtual line in the main scanning direction S, the virtual line bisecting an area of a planar shape of the head viewed from above and being orthogonal to the main scanning direction S. In some cases, a position of a virtual line in the main scanning direction S may be considered as the center of the head in the main scanning direction S, the virtual line being orthogonal to the main scanning direction S and bisecting an area of a convex polygon having the smallest area among convex polygons including all the ejection nozzles of the head when the head is viewed from above.

First, timing at which each solution lands on the point P on the workpiece W in the printing area 12 will be described. Since a moving speed of the carriage 3 is constant, description will be made in the following using a distance. Actual timing (time) can be calculated by dividing each distance by the moving speed of the carriage 3. Note that the point P is assumed to be at a position at a distance A from an end portion of the printing area 12 on the maintenance area 13 side.

Furthermore, it is assumed here that a liquid is ejected from the center of the head in the main scanning direction S. In a case where the nozzles included in each head are actually distributed while spreading in the main scanning direction S, the spreading also affects the landing timing. However, since a difference between positions in the main scanning direction S of the nozzles in one head is smaller in many cases than a difference between positions in the main scanning direction S of the nozzles in different heads, the influence of head arrangement can be estimated assuming that the liquid is ejected from the center of the head in the main scanning direction.

In addition, in order to make the description easy to understand, the description is made as if the ejection timing and the landing timing are the same. In practice, the ejection is performed earlier than the landing timing by a flight time during which a liquid flies from the head to the workpiece W such that the liquid lands at a predetermined position at predetermined timing.

It is assumed that a one-way moving distance of the carriage 3 (a distance to move from the maintenance area 13 to the turnaround area 14) is a minimum distance LP+LC necessary for printing, and the carriage 3 is arranged in the maintenance area 13 as an initial position. In this case, in first movement operation (movement in the left direction) in which the carriage 3 moves from the maintenance area 13 to the turnaround area 14, timing T1 at which the preprocessing solution ejected from the preprocessing head 5 lands at the point P can be expressed by the following Formula A in terms of distance.

$$T1=A+B1 \quad \text{(Formula A)}$$

In second movement operation (movement in the right direction) in which the carriage 3 moves from the turnaround area 14 to the maintenance area 13 after the preprocessing solution lands at the point P, the ink is ejected from each ink head of the first ink head line 41 to the point P. Furthermore, in third movement operation (movement in the left direction) in which the carriage 3 further moves from the maintenance area 13 to the turnaround area 14, the ink is ejected from each ink head of the second ink head line 42 to the point P.

In the above description, timing T2 at which the red ink (first time ink, also referred to as first ink) lands on the point P from the upstream side head 4D1 of the fourth ink head 4D can be expressed by the following Formula B.

$$T2=(LP+LC)+(LP-A)+(LC-K) \quad \text{(Formula B)}$$

The term in the first parentheses of the above Formula B corresponds to time of movement of the carriage 3 from the maintenance area 13 to the turnaround area 14 in the first movement operation, the term in the second parentheses corresponds to time until a distal end of the carriage 3 reaches the point P in the second movement operation, and the term in the third parentheses corresponds to time until a predetermined ink head reaches the point P due to further movement of the carriage 3.

From the above Formulas A and B, time ΔT from landing of the preprocessing solution to first landing of the ink at the point P can be expressed by the following Formula C.

$$\Delta T = T2 - T1 = LP - 2A + LC - (B1 + K) + LP + LC \qquad \text{(Formula C)}$$

On the other hand, during the printing on the workpiece W, the carriage 3 may first move from the turnaround area 14, i.e., may move in the right direction as the first movement operation. In this case, similarly to the above, the time ΔT from the landing of the preprocessing solution at the point P to the landing of the first (first time) red ink can be expressed by the following Formula D.

$$\Delta T = 2A - LP - (LC - (B1 + K)) + (LP + LC) \qquad \text{(Formula D)}$$

Here, for the consideration of all the points on the workpiece W in the printing area 12, since the distance A can be assumed to change from 0 to LP, the range of ΔT can be expressed, from the above Formula C and Formula D, by the following Formulas E, F, and G.

$$\Delta T \text{ min } 1 \le \Delta T \le \Delta T \text{ max } 1 \qquad \text{(Formula E)}$$

$$\Delta T \text{ min } 1 = -LP - |LC - (B1 + K)| + (LP + LC) \qquad \text{(Formula F)}$$

$$\Delta T \text{ max } 1 = LP + |LC - (B1 + K)| + (LP + LC) \qquad \text{(Formula G)}$$

Next, on the basis of the same concept as described above, description will be made of time ΔT from when the red ink (2nd ink, also referred to as last ink) ejected from the downstream side head 4D2 of the fourth ink head 4D lands at the point P to when the postprocessing solution lands. In a case where the first movement operation is movement in the left direction from the maintenance area 13 to the turnaround area 14, the time ΔT from when the red ink of the downstream side head 4D2 lands at the point P to when the postprocessing solution lands can be expressed by the following Formula H.

$$\Delta T = LP - 2A + (LC - (K + B2)) + (LP + LC) \qquad \text{(Formula H)}$$

When there are even-numbered ink head lines of the ink heads 4 along the conveyance direction F, second landing of the ink comes after first landing of the ink expressed by Formula C. On the other hand, when there are odd-numbered ink head lines of the ink heads 4 along the conveyance direction F, the second landing of the ink comes after the first landing of the ink expressed by Formula D.

Similarly, in a case where the first movement operation is movement in the right direction from the turnaround area 14 to the maintenance area 13, the time ΔT from when the red ink of the downstream side head 4D2 lands at the point P to when the postprocessing solution lands can be expressed by the following Formula I.

$$\Delta T = 2A - LP - (LC - (K + B2)) + (LP + LC) \qquad \text{(Formula I)}$$

Note that in this case, when there are even-numbered ink head lines of the ink heads 4 along the conveyance direction F, the second landing of the ink comes after the first landing of the ink expressed by Formula D. On the other hand, when there are odd-numbered ink head lines of the ink heads 4 along the conveyance direction F, the second landing of the ink comes after the first landing of the ink expressed by Formula C.

Similarly, for the consideration of all the points on the workpiece W in the printing area 12, since the distance A can be assumed to change from 0 to LP, the range of ΔT can be expressed, from the above Formula H and Formula I, by the following Formulas J, K, and L.

$$\Delta T \text{ min } 2 \le \Delta T \le \Delta T \text{ max } 2 \qquad \text{(Formula J)}$$

$$\Delta T \text{ min } 2 = -LP - |LC - (K + B2)| + (LP + LC) \qquad \text{(Formula K)}$$

$$\Delta T \text{ max } 2 = LP + |LC - (K + B2)| + (LP + LC) \qquad \text{(Formula L)}$$

In Formulas E to G and Formulas J to L, since in order to include the arrangement of all the ink heads, K ranges from 0 to LC, when absolute values of LC−(B1+K) and LC−(K+B2) are small, it is possible to suppress generation of color having a large time variation of ΔT. In other words, bringing B1 and B2 closer to LC/2 makes it possible to suppress generation of color having a large time variation. When only the landing timing is considered, it is most desirable that both B1 and B2 are LC/2.

Then, as a result of intensive experiments and consideration, the inventors of the present disclosure have found that when Formula 1 below is satisfied, it is possible to form a stable image while reducing a variation in time from the landing of the preprocessing solution to the landing of the ink on the workpiece W irrespective of the moving direction of the carriage 3.

$$|(B1 - LC/2)|/LC \le 1/4 \qquad \text{(Formula 1)}$$

Similarly, when Formula 2 below is satisfied, it is possible to form a stable image while reducing a variation in time from the landing of the ink to the landing of the postprocessing solution on the workpiece W.

$$|(B2 - LC/2)|/LC \le 1/4 \qquad \text{(Formula 2)}$$

When a plurality of the preprocessing heads 5 are arranged, it is desirable that at least one preprocessing head 5 is arranged so as to satisfy Formula 1. By thus arranging at least one preprocessing head 5 so as to satisfy Formula 1, it is possible to further eject the preprocessing solution from other preprocessing head 5 in addition to reducing the variation in the time from the landing of the preprocessing solution to the landing of the ink, so that it is possible to increase an ejectable amount of the preprocessing solution.

Note that it is further desirable that all of the plurality of preprocessing heads 5 described above are arranged so as to satisfy Formula 1. In this case, while the variation in the time from the landing of the preprocessing solution to the landing of the ink can be further reduced, an ejectable amount of the processing solution can be increased.

Similarly, when a plurality of the postprocessing heads 6 are arranged, it is desirable that at least one postprocessing head 6 is arranged so as to satisfy Formula 2. By thus arranging at least one postprocessing head 6 so as to satisfy Formula 2, it is possible to further eject the postprocessing solution from other postprocessing head 6 in addition to reducing the variation in the time from the landing of the ink to the landing of the postprocessing solution, so that it is possible to increase an ejectable amount of the postprocessing solution.

Note that it is further desirable that all of the plurality of postprocessing heads 6 described above are arranged so as to satisfy Formula 2. In this case, while the variation in the time from the landing of the ink to the landing of the postprocessing solution can be further reduced, an ejectable amount of the postprocessing solution can be increased.

Note that although as Example 1, the description has been made of the carriage 3 on which the processing heads of both the preprocessing head 5 and the postprocessing head 6 are mounted, the processing head mounted on the carriage 3 may be only the preprocessing head 5 or only the postprocessing head 6. When Formula 1 is satisfied in the carriage 3 on which the ink head 4 and only the preprocessing head 5 as the processing head are mounted, the variation in time from the landing of the preprocessing solution to the landing of the ink can be reduced. When Formula 2 is satisfied in the carriage 3 on which the ink head 4 and only the postprocessing head 6 as the processing head are mounted, the variation in time from the landing of the ink to the landing of the preprocessing solution to can be reduced.

Next, more desirable arrangement of the preprocessing head 5 and the postprocessing head 6 defined by the above Formula 1 and Formula 2 will be described. When considering Formulas E to G, the range of ΔT differs among the first to sixth ink heads 4A to 4F. In other words, the range of ΔT varies with a magnitude of K. In the example illustrated in FIG. 7, when B1>LC/2, the larger a value of K, the larger a variation range of ΔT. In other words, the time variation is the largest in the black ink of the sixth ink head 4F among the ink heads 4. When the first movement operation is movement in the left direction from the maintenance area 13 to the turnaround area 14, a variation time of ΔT is minimized at a position of A=LP, and when the first movement operation is movement in the right direction from the turnaround area 14 to the maintenance area 13, the variation time of ΔT is maximized at the position of A=LP.

In the above example, since the variation in the time from the landing of the preprocessing solution to the first landing of the black ink is large, when the variation in the time from the second landing of the black ink to the landing of the postprocessing solution is similarly large, a variation in image quality of a black image becomes conspicuous as compared with images of other colors, making image seen with naked eyes be liable to be affected. Therefore, in the sixth ink head 4F that ejects the black ink having a large K value, it is desirable to reduce a variation in the time from the second landing of the black ink to the landing of the postprocessing solution. Specifically, it is desirable to arrange the postprocessing head 6 such that B2 becomes small.

As a result of giving the same consideration as described above to each ink head 4, the inventors of the present disclosure have found that in a case where a plurality of ink head lines including ink heads that eject inks of the same color are mounted on the carriage 3, and the ink heads 4 are arranged in a cluster for each color in the main scanning direction, it is effective to set an absolute value of (B1+B2−LC)/LC to be small, and it is desirable to satisfy the following Formula 3, and it is more desirable to satisfy Formula 4 in order to suppress a situation where a variation in time from landing of the preprocessing solution to first landing of ink of a predetermined color becomes large, and moreover, a variation in time from second landing of the ink to landing of the postprocessing solution becomes large.

$$|(B1+B2-LC)/LC|\leq 1/2 \quad \text{(Formula 3)}$$

$$|(B1+B2-LC)/LC|\leq 1/3 \quad \text{(Formula 4)}$$

On the basis of the above idea, in the head arrangement having two ink head lines as shown in Example 1 of FIG. 6, the distance LC in the main scanning direction S from the downstream side head 4A2 of the first ink head 4A to the upstream side head 4F1 of the sixth ink head 4F is set to LC=11, the distance B1 in the main scanning direction S from the downstream side head 4A2 to the preprocessing head 5 is set to B1=6, and the distance B2 in the main scanning direction S from the downstream side head 4A2 to each of the postprocessing heads 6 is set to B2=5 or 7. In this case, |(B1−LC/2)|/LC=0.045, which satisfies the above Formula 1. In addition, |(B2−LC/2)|/LC=0.045 or 0.136, both of which satisfy the above Formula 2. Accordingly, the variation in the time from the landing of the preprocessing solution to the landing of the ink ejected by the first ink head line 41 and the variation in the time from the landing of the ink ejected by the second ink head line 42 to the landing of the postprocessing solution can be reduced. As a result, the preprocessing solution, the ink, and the postprocessing solution can be stably and sequentially landed on the workpiece W, making image quality hardly vary on the workpiece W. In addition, |(B1+B2−LC)/LC|=0 or 0.18, both of which satisfy the above Formula 3 and Formula 4. Accordingly, in a case where the plurality of ink head lines including the ink heads that eject the ink of the same color are mounted on the carriage 3, it is possible to suppress the situation where the variation in time from the landing of the preprocessing solution to the first landing of the ink becomes large, and moreover, the variation in time from the second landing of the ink to the landing of the postprocessing solution becomes large.

As described above, although one postprocessing head 6 of the first postprocessing head 6A and the second postprocessing head 6B as the postprocessing head 6 may be arranged at a position that does not satisfy the above Formulas 1 to 4, it is most desirable that both of the postprocessing heads 6 satisfy the above Formulas 1 to 4 as illustrated in FIG. 6.

Example 2

Figure 8:
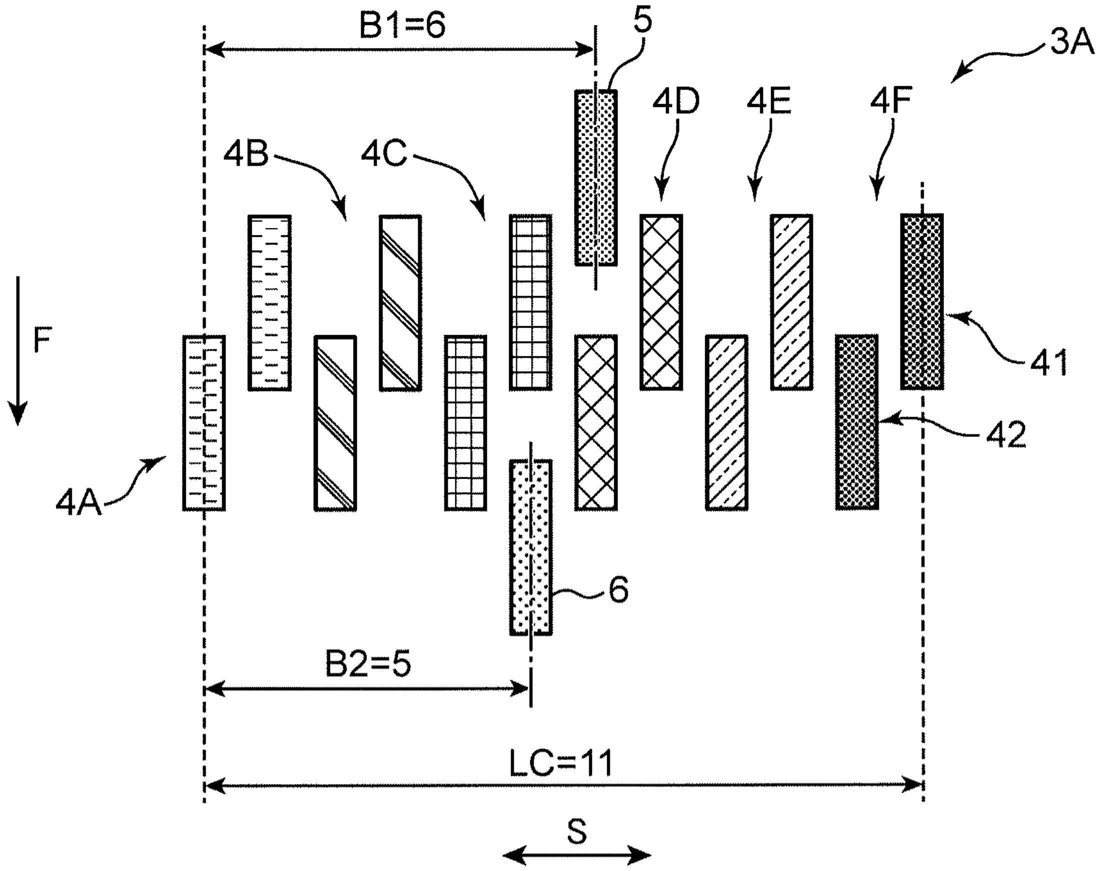
FIG. 8 is a plan view of a carriage showing head arrangement according to Example 2.

Furthermore, FIG. 8 is a plan view of a carriage 3A showing head arrangement according to Example 2. Also in Example 2, the ink head 4 has the first ink head line 41 and the second ink head line 42, and the preprocessing head 5 and the postprocessing head 6 are positioned at a substantially central portion in the main scanning direction S of an array of all the heads. The head arrangement is set to have LC=11, B1=6, and B2=5. In this case, |(B1−LC/2)|/LC=0.045, which satisfies the above Formula 1. In addition, |(B2−LC/2)|/LC=0.045, which satisfies the above Formula 2. Accordingly, the variation in the time from the landing of the preprocessing solution to the landing of the ink ejected by the first ink head line 41 and the variation in the time from the landing of the ink ejected by the second ink head line 42 to the landing of the postprocessing solution can be reduced. In addition, (B1+B2−LC)/LC|=0, all of which satisfy the above Formula 3 and Formula 4. Accordingly, in a case where the plurality of ink head lines including the ink heads that eject the ink of the same color are mounted on the carriage 3, it is possible to suppress the situation where the variation in time from the landing of the preprocessing solution to the first landing of the ink becomes large, and moreover, the variation in time from the second landing of the ink to the landing of the postprocessing solution becomes large.

Example 3

Figure 9:
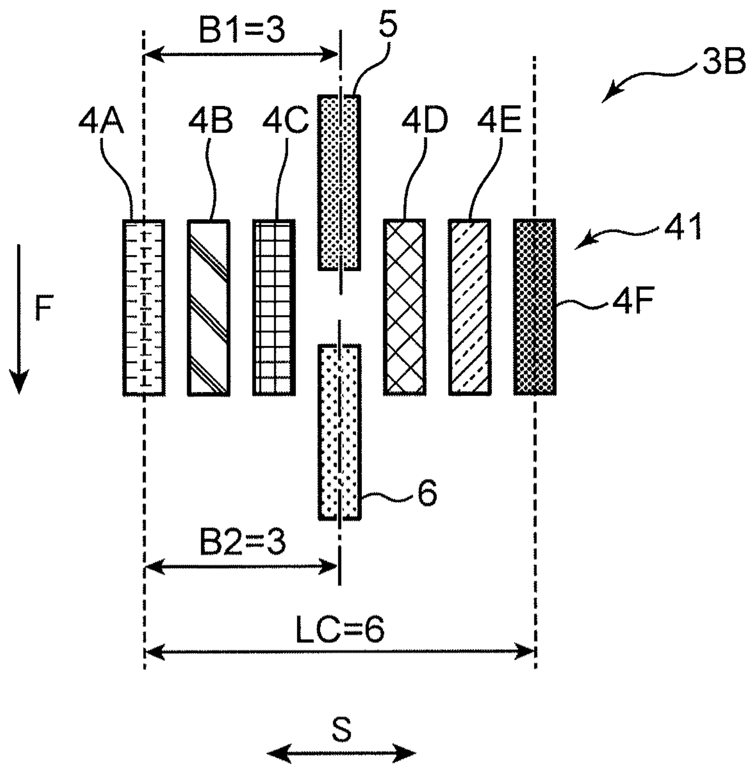
FIG. 9 is a plan view of a carriage showing head arrangement according to Example 3.

Furthermore, FIG. 9 is a plan view of a carriage 3B showing head arrangement according to Example 3. In Example 3, the ink head line is one line. Also in Example 3, the preprocessing head 5 and the postprocessing head 6 are located at the substantially central portion in the main scanning direction S of the array of all the heads. The head arrangement shown in FIG. 9 is set to have LC=6, B1=3, and B2=3. In this case, $|(B1-LC/2)|/LC=0$, which satisfies the above Formula 1. In addition, $|(B2-LC/2)|/LC=0$, which satisfies the above Formula 2. In addition, $|(B1+B2-LC)/LC|=0$, which satisfies the above Formula 3 and Formula 4. Accordingly, the same effects as those of Examples 1 and 2 can be obtained.

Desirable head arrangement will be further described below on the basis of other Examples.

Example 4

Figure 10:
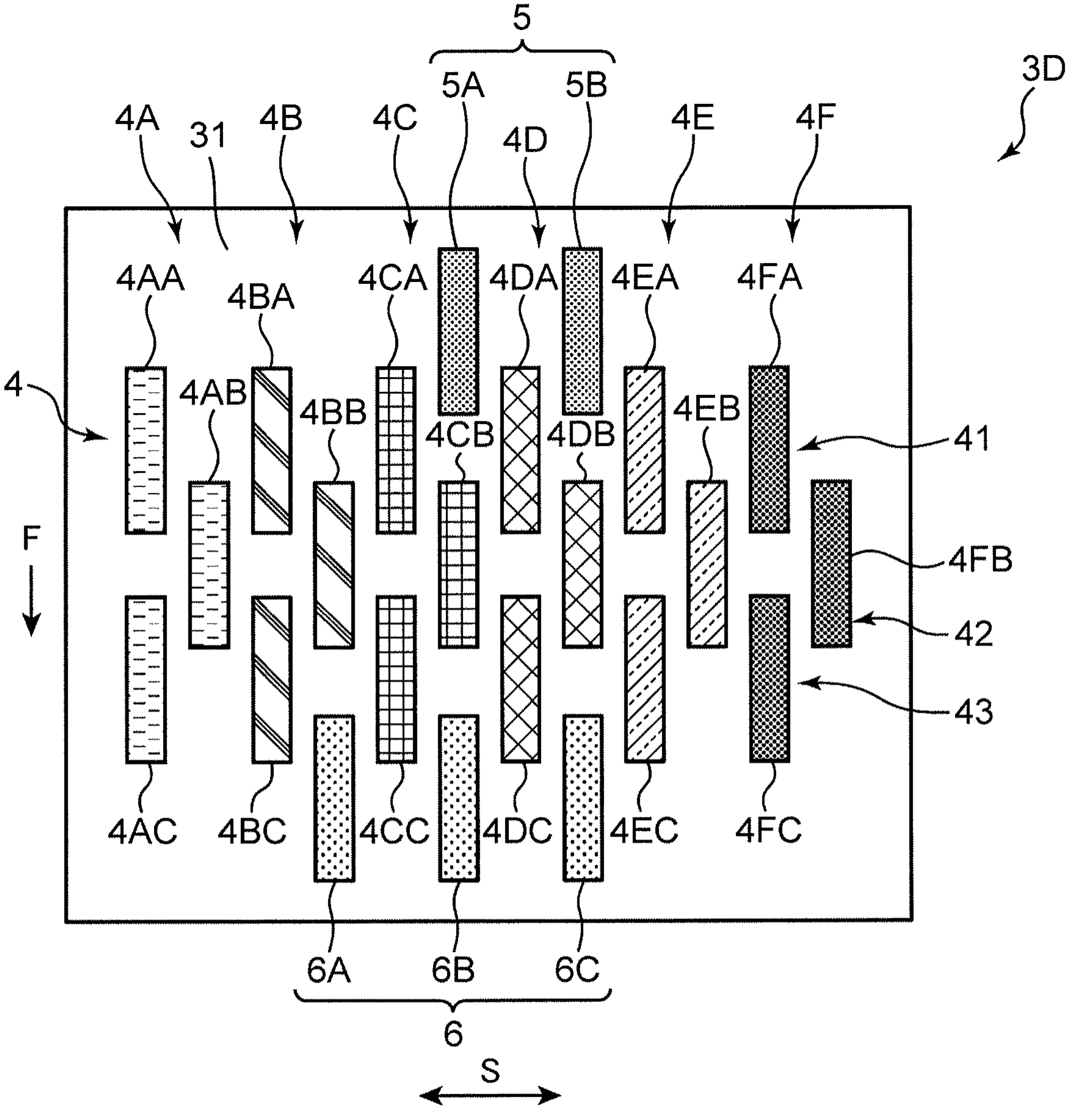
FIG. 10 is a plan view of a carriage showing head arrangement according to Example 4.

FIG. 10 is a plan view schematically showing a carriage 3D having head arrangement according to Example 4. Example 4 is different from Example 1 in that the number of unit heads of each head is increased. Specifically, although the ink head 4 is the same as that of Example 1 in including the first to sixth ink heads 4A to 4F that respectively eject the inks of the six colors different from each other, each of the ink heads 4A to 4F of the respective colors includes three unit heads (total 18). In other words, the ink head 4 has three ink head lines (odd-numbered lines) including the first ink head line 41, the second ink head line 42, and a third ink head line 43. The preprocessing head 5 arranged on the upstream side in the conveyance direction F of the ink head 4 includes two unit heads, and the postprocessing head 6 arranged on the downstream side includes three unit heads. Note that the preprocessing head 5 and the postprocessing head 6 are arranged within the range of the arrangement width of the ink head 4 in the main scanning direction S, which is the same as Example 1.

The first ink head 4A includes an upstream side head 4AA, a central head 4AB, and a downstream side head 4AC as the unit heads. Of the first ink head 4A, the upstream side head 4AA is arranged on a most upstream side in the conveyance direction F of the carriage 3A. The downstream side head 4AC is arranged downstream of the upstream side head 4AA at the same position as the upstream side head 4AA in the main scanning direction S. The central head 4AB is arranged at a position shifted rightward in the main scanning direction S from the upstream side head 4AA and the downstream side head 4AC, and is arranged downstream of the upstream side head 4AA and upstream of the downstream side head 4AC in the conveyance direction F. The central head 4AB is arranged at a position partially overlapping the upstream side head 4AA and the downstream side head 4AC in the conveyance direction F.

The second to sixth ink heads 4B to 4F also include upstream side heads 4BA, 4CA, 4DA, 4EA, and 4FA, central heads 4BB, 4CB, 4DB, 4EB, and 4FB, and downstream side heads 4BC, 4CC, 4DC, 4EC, and 4FC, respectively, which are similar to the upstream side head 4AA, the central head 4AB, and the downstream side head 4AC described above. The upstream side heads 4AA to 4FA, the central heads 4BB to 4FB, and the downstream side heads 4BC to 4FC of the first to sixth ink heads 4A to 4F are aligned at the same position in the conveyance direction F and at predetermined intervals in the main scanning direction S. In addition, the ink heads 4 are arranged in a cluster for each color in the main scanning direction.

The preprocessing head 5 includes a first preprocessing head 5A and a second preprocessing head 5B arranged at the same position in the conveyance direction F and spaced apart side by side in the main scanning direction S. The first preprocessing head 5A is arranged so as to have a part of its downstream portion interposed between the upstream side head 4CA of the third ink head 4C and the upstream side head 4DA of the fourth ink head 4D. The second preprocessing head 5B is arranged so as to have a part of its downstream portion interposed between the upstream side head 4DA of the fourth ink head 4D and the upstream side head 4EA of the fifth ink head 4E.

The postprocessing head 6 includes the first postprocessing head 6A, the second postprocessing head 6B, and the third postprocessing head 6C arranged at the same position in the conveyance direction F and spaced apart side by side in the main scanning direction S. The first postprocessing head 6A is arranged so as to have a part of its upstream side portion interposed between the downstream side head 4BC of the second ink head 4B and the downstream side head 4CC of the third ink head 4C. The second postprocessing head 6B is arranged so as to have a part of its upstream portion interposed between the downstream side head 4CC of the third ink head 4C and the downstream side head 4DC of the fourth ink head 4D. The third postprocessing head 6C is arranged so as to have a part of its upstream portion interposed between the downstream side head 4DC of the fourth ink head 4D and the downstream side head 4EC of the fifth ink head 4E.

In the head arrangement of FIG. 10, LC=11, B1=5, 7, and B2=3, 5, 7, where the upstream side head 4AA or the downstream side head 4AC of the first ink head 4A is one-end side head. In this case, $|(B1-LC/2)|/LC=0.045$ or 0.136, both of which satisfy the above Formula 1. In addition, $|(B2-LC/2)|/LC=0.227$, 0.045 or 0.136, all of which satisfy the above Formula 2. In addition, in a case of B1=5, $(B1+B2-LC)/LC|=0.273$, 0.091, or 0.091 for each B2 value, all of which satisfy the above Formula 3 and Formula 4. Furthermore, in a case of B1=7, $(B1+B2-LC)/LC|=0.091$, 0.091, or 0.272 for each B2 value, all of which satisfy the above Formula 3 and Formula 4. Accordingly, the same effects as those of Examples 1 and 2 can be obtained.

Additionally, according to the head arrangement according to Example 4, the same advantage as that of Example 1 can be obtained. In other words, it is possible to increase ejection amounts of necessary ink and processing solution while reducing the size of the carriage 3D. In particular, in Example 4, since both the preprocessing head 5 and the postprocessing head 6 include a plurality of unit heads, it is possible to sufficiently increase ejection amounts of the preprocessing solution and the postprocessing solution. Since the first to sixth ink heads 4A to 4F also include the unit heads arranged in three lines, a sufficiently large ejection amount of ink can be obtained.

Example 5

Figure 11:
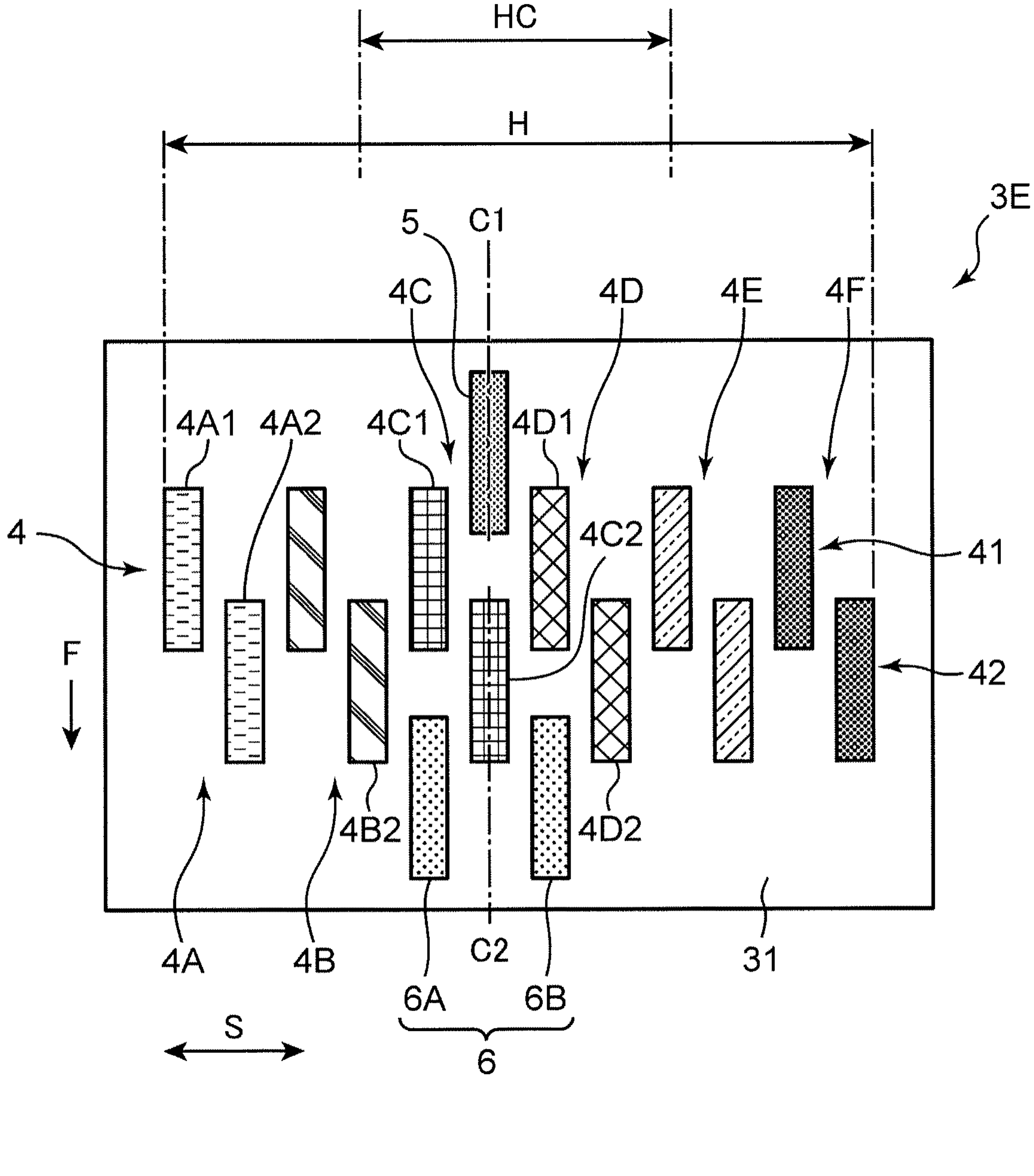
FIG. 11 is a plan view of a carriage showing head arrangement according to Example 5.

FIG. 11 is a plan view schematically showing a carriage 3E having head arrangement according to Example 5. Similarly to Example 1 (FIG. 6), Example 5 shows an example in which the preprocessing head 5 and the postprocessing head 6 are arranged in a central region HC of the arrangement width H. Example 5 is, however, different from Example 1 in the arrangement of the ink heads 4 as will be described later.

On the head support frame 31 of the carriage 3E, the first to sixth ink heads 4A to 4F that respectively eject the inks of the six different colors, the preprocessing head 5 and the postprocessing head 6 are mounted. The first to sixth ink heads 4A to 4F each include the unit heads arranged in two lines similarly to Example 1. Note that a shift direction of the downstream side head of each of the ink heads 4A to 4F is reverse to that of Example 1, such as the downstream side head 4A2 is arranged on the right side of the upstream side head 4A1 in the first ink head 4A. One preprocessing head 5 and two postprocessing heads 6, the first and second postprocessing heads 6A and 6B, are provided.

The preprocessing head 5 and the postprocessing head 6 are arranged in the central region HC in the arrangement width H of the first to sixth ink heads 4A to 4F in the main scanning direction S. The present example is the same as the above Example 1 in that the preprocessing head 5 is arranged upstream of the array of the first to sixth ink heads 4A to 4F in the conveyance direction F, and the postprocessing head 6 is arranged downstream of the same. The preprocessing head 5 is arranged at the same position as the downstream side head 4C2 of the third ink head 4C in the main scanning direction S and on the upstream side of the downstream side head in the conveyance direction F. The preprocessing head 5 is arranged so as to have a part of its downstream portion interposed between the upstream side heads 4C1 and 4D1 of the third and fourth ink heads 4C and 4D.

The first and second postprocessing heads 6A and 6B are arranged at the same position in the conveyance direction F and arranged side by side at predetermined intervals in the main scanning direction S. The first postprocessing head 6A is arranged so as to have its upstream side portion interposed between the downstream side head 4B2 of the second ink head 4B and the downstream side head 4C2 of the third ink head 4C. The second postprocessing head 6B is arranged so as to have its upstream side portion interposed between the downstream side head 4C2 and the downstream side head 4D2 of the fourth ink head 4D.

In the head arrangement in Example 5, the distance LC in the main scanning direction S from the upstream side head 4A1 of the first ink head 4A to the downstream side head of the sixth ink head 4F is set to LC=11, the distance B1 in the main scanning direction S from the upstream side head 4A1 to the preprocessing head 5 is set to B1=5, and the distance B2 in the main scanning direction S from the upstream side head 4A1 to each postprocessing head 6 is set to B2=4 or 6. In this case, $|(B1-LC/2)|/LC=0.045$, which satisfies the above Formula 1. In addition, $|(B2-LC/2)|/LC=0.136$ or 0.045, both of which satisfy the above Formula 2. Accordingly, the variation in the time from the landing of the preprocessing solution to the landing of the ink ejected by the first ink head line 41 and the variation in the time from the landing of the ink ejected by the second ink head line 42 to the landing of the postprocessing solution can be reduced. As a result, the preprocessing solution, the ink, and the postprocessing solution can be stably and sequentially landed on the workpiece W, making image quality hardly vary on the workpiece W. In addition, $|(B1+B2-LC)/LC|=0.18$ or 0, both of which satisfy the above Formula 3 and Formula 4. Accordingly, in a case where the plurality of ink head lines including the ink heads that eject the ink of the same color are mounted on the carriage 3, it is possible to suppress the situation where the variation in time from the landing of the preprocessing solution to the first landing of the ink becomes large, and moreover, the variation in time from the second landing of the ink to the landing of the postprocessing solution becomes large.

In addition, the preprocessing head 5 and the postprocessing head 6 are not only arranged in the central region HC of the arrangement width H, but also arranged such that an arrangement center of the preprocessing head 5 and an array center of the first and second postprocessing heads 6A and 6B coincide with each other in the main scanning direction S. In the present Example, since there is only one preprocessing head 5, the center of the preprocessing head 5 in the main scanning direction S will be an arrangement center C1. The postprocessing head 6 has an intermediate point between the first postprocessing head 6A and the second postprocessing head 6B as an array center C2. The preprocessing head 5 and the postprocessing head 6 are arranged on the head support frame 31 such that the arrangement center C1 and the array center C2 are at the same position in the main scanning direction S.

As described with reference to FIG. 4, in the present embodiment, the carriage 3 repeats the forward main scanning and the backward main scanning to sequentially land the preprocessing solution, the ink, and the postprocessing solution on the workpiece W. By adopting the head arrangement of Example 5 when such two-way main scanning is adopted, it is possible to reduce, at each main scanning position, particularly a variation in time from landing of the preprocessing solution to landing of the ink on the workpiece W and a variation in time from landing of the ink to landing of the postprocessing solution.

In this case, the central region HC is desirably a region located at the center of the range of the arrangement width H and having a width of half the arrangement width H, and further desirably ⅓ of the same. That the processing head is arranged in the central region HC means that the array center of the processing heads is arranged in the central region HC, and half or more of the arrangement centers of the processing heads are arranged in the central region HC. Furthermore, all the arrangement centers of the processing heads may be arranged in the central region HC.

Example 6

Example 6, and Example 7 to follow illustrate head arrangement in which a measure against heat generation of the processing heads 5 and 6 is taken. Generally, a head that ejects liquid by a jet method generates heat for pressurizing the liquid using electricity. The ink head 4 performs the ejection operation only at the time of forming a necessary color dot. By contrast, the preprocessing head 5 and the postprocessing head 6 require the ejection operation of the preprocessing solution and the postprocessing solution corresponding to dots of all colors. Accordingly, the preprocessing head 5 and the postprocessing head 6 are liable to have higher temperatures than the ink heads 4. Therefore, it is desirable to conduct head arrangement assuming that the preprocessing head 5 and the postprocessing head 6 will have high temperatures.

Figure 12:
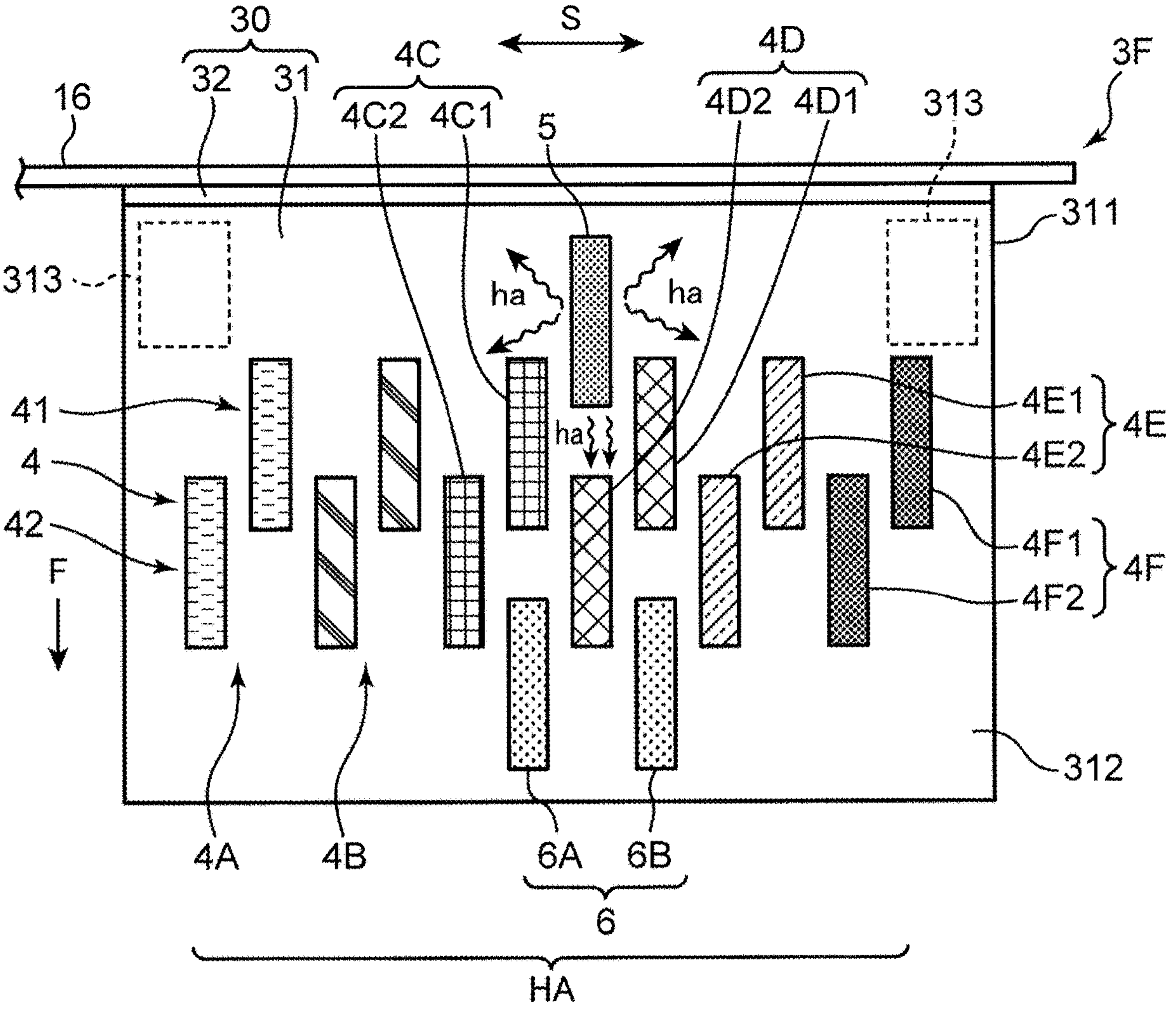
FIG. 12 is a plan view of a carriage showing head arrangement according to Example 6.

FIG. 12 is a plan view schematically showing a carriage 3F having head arrangement according to Example 6. In the carriage 3F, the back frame 32 (engagement portion) is held by the guide rails 17 (holding members) (FIG. 1) in the cantilevered state. On the head support frame 31, the ink head 4 including the first to sixth ink heads 4A to 4F, one preprocessing head 5, and the postprocessing head 6 including the first and second postprocessing heads 6A and 6B are mounted. Since the arrangement of the heads is the same as that of Example 1 shown in FIG. 6, description thereof is omitted here.

In such head arrangement as illustrated in Example 6, LC=11, B1=6, and B2=5, 7. In this case, $|(B1-LC/2)|/LC=0.045$, which satisfies the above Formula 1. In addition, $|(B2-LC/2)|/LC=0.045$ or 0.136, both of which satisfy the above Formula 2. In addition, |(B1+B2−LC)/LC|=0 or 0.18, both of which satisfy the above Formula 3 and Formula 4.

In addition, in the present Example, the preprocessing head 5 is configured with one unit head, and the postprocessing head 6 is configured with two unit heads (the first and second postprocessing heads 6A and 6B). Among the preprocessing head 5 and the postprocessing head 6, the preprocessing head 5 having a smaller number of the unit head is arranged on the proximal end side 311 of the head support frame 31. The postprocessing head 6 having a large number of the unit heads is arranged on the distal end side 312. In other words, an upstream side end edge of the head support frame 31 in the conveyance direction F is the side held by the guide rails 17.

As described in the foregoing, the processing heads 5 and 6 generate heat by the ejection operation. As schematically illustrated in FIG. 12, the preprocessing head 5 heated to a high temperature dissipates heat ha. The same applies to the first and second postprocessing heads 6A and 6B. The head support frame 31 of the carriage 3F is heated by the heat ha, so that thermal deformation might be caused on the head support frame 31, the back frame 32 which is a holding structure of the head support frame, a fixing metal for fixing the back frame 32 and the timing belt 16, and the like. This thermal deformation could affect landing accuracy of the ink ejected from the ink head 4 in the carriage 3F held in the cantilevered state.

However, in the carriage 3F of Example 6, the preprocessing head 5 having the smaller number of the unit head is arranged on the proximal end side 311, which is the side on which the head support frame 31 is cantilevered. As a result, it is possible to reduce the influence (decrease in landing accuracy) of thermal deformation. If the postprocessing head 6 having the large number of the unit heads is arranged on the proximal end side 311, the back frame 32 receives heat ha dissipated from the two unit heads, and is more likely to have a high temperature and to be thermally deformed.

In addition, in the carriage 3F of Example 6, the preprocessing head 5 is arranged at a position excluding an end in the main scanning direction S of a head array HA (head arrangement region) of the ink head 4 and the processing heads 5 and 6. Among the heads 4, 5, and 6 mounted on the carriage 3F, the preprocessing head 5 as the processing head is a head arranged on a side closest to the back frame 32 (engagement portion). Such preprocessing head 5 is arranged at a position excluding an arrangement end 313 which is an end of the head array HA.

Since the carriage 3F cannot be increased in size uselessly, if a head is arranged at the arrangement end 313 of the head array in the main scanning direction S, the head will be a head closest to a corner of the carriage 3F (the head support frame 31) in the main scanning direction S. Since the vicinity of the arrangement end 313 is also the vicinity of the cantilevered back frame 32, thermal deformation occurring in that vicinity can invite distortion or positional deviation in a height direction or a horizontal direction of the head support frame 31. This lowers landing position accuracy of the heads 4, 5, and 6 mounted on the carriage 3F. Accordingly, by not arranging, in a region of the arrangement end 313, the processing head (the preprocessing head 5 and the postprocessing head 6) that will have a high temperature, it is possible to make the above-described problem of thermal deformation hardly occur.

The present Example has staggered arrangement in which among the two lines of the ink heads 4 (the first ink head line 41 and the second ink head line 42), the line of the heads 4 arranged on the engagement portion side is at a position shifted to the right side in FIG. 12. Furthermore, the preprocessing head 5, which is a processing head with the smaller number of the head, is arranged on the engagement portion side, and the preprocessing head 5 is arranged at the center of the arrangement positions forming the staggered arrangement. With such arrangement, the heads can be arranged such that no processing head is arranged at the arrangement end 313.

A preferable arrangement example of the ink heads will be further described with reference to the head arrangement of the carriage 3F illustrated in FIG. 12. In the carriage 3F, the preprocessing head 5 that will have a high temperature is arranged so as to have a part thereof adjacent to the ink head 4. Specifically, the preprocessing head 5 is adjacent to the upstream side heads 4C1 and 4D1 of the third and fourth ink heads 4C and 4D, respectively, in the main scanning direction S, and is adjacent to the downstream side head 4D2 of the fourth ink head 4D in the conveyance direction F. In addition, the first postprocessing head 6A is adjacent to the downstream side heads 4C2 and 4D2 of the third and fourth ink heads 4C and 4D, respectively, in the main scanning direction S, and is adjacent to the upstream side head 4C1 in the conveyance direction F. The second postprocessing head 6B is adjacent to the downstream side heads 4D2 and 4E2 of the fourth and fifth ink heads 4D and 4E, respectively, in the main scanning direction S, and is adjacent to the upstream side head 4D1 in the conveyance direction F. On the other hand, the preprocessing head 5 and the postprocessing head 6 are not adjacent to the first, second, and sixth ink heads 4A, 4B, and 4F.

In the above head arrangement, for example, the third, fourth, and fifth ink heads 4C, 4D and 4E (the first ink heads that eject the first color ink) that eject yellow, red, and blue inks, respectively, have a larger number of the unit heads adjacent to the preprocessing head 5 and the postprocessing head 6 than the first, second, and sixth ink heads 4A, 4B, and 4F (the second ink heads that eject the second color ink) that eject orange, green, and black inks, respectively. In other words, the third, fourth, and fifth ink heads 4C, 4D, and 4E are ink heads that are likely to have a higher temperature than the other ink heads 4A, 4B, and 4F.

When viscosity of the ink greatly changes with a temperature change, characteristics of ink ejection (ejection amount and the like) from the ink head also change. Viscosity change characteristics due to temperature vary with a type of ink. Accordingly, in the case of the present Example, as the ink to be ejected from the third, fourth, and fifth ink heads 4C, 4D, and 4E that are likely to have a high temperature, ink is ejected that has a smaller viscosity change caused by temperature than the ink to be ejected from the first, second, and sixth ink heads 4A, 4B, and 4F. As a result, even if the third, fourth, and fifth ink heads 4C, 4D, and 4E are heated by the preprocessing head 5 and the postprocessing head 6, a change of the ejection amount and the ejection speed of the ink ejected from each of these ink heads 4C, 4D, and 4E with the temperature can be reduced.

In this case, for each ink, the number of the unit heads of the processing head adjacent to the ink head 4 may be evaluated as the largest number of the unit heads of the processing heads adjacent to the ink head 4 that ejects a certain ink. With respect to the first, second, and sixth ink heads 4A, 4B, and 4F, the maximum number of the unit heads of the adjacent processing heads is zero. With respect to the third ink head 4C, the maximum number of the unit heads of the adjacent processing heads is two, and with respect to the fourth ink head 4D, the maximum number of the unit heads of the adjacent processing heads is three. With respect to the fifth ink head 4E, the maximum number of the unit heads of the adjacent processing heads is one.

Furthermore, for each ink, the number of the unit heads of the processing head adjacent to the ink head 4 may be evaluated as an average of the numbers of the unit heads of the processing heads adjacent to the ink head 4 that ejects a certain ink. With respect to the first, second, and sixth ink heads 4A, 4B, and 4F, an average number of unit heads of adjacent processing heads is zero. With respect to the third ink head 4C, the average number of the unit heads of the adjacent processing head is 1.5, and with respect to the fourth ink head 4D, the average number of the unit heads of the adjacent processing head is 2.5. With respect to the fifth ink head 4E, the average number of the unit heads of the adjacent processing head is 0.5.

As evaluation obtained by combining these manners, for example, the maximum number of the unit heads of the adjacent processing head may be evaluated first, and with respect to ink having no difference in this evaluation, an average of the numbers of the unit heads of the adjacent processing heads may be evaluated.

Furthermore, an order of likelihood of having a high temperature among the ink heads 4 that eject the respective inks may be evaluated, and ink having less change in viscosity with temperature may be ejected in the order of likelihood of having a high temperature.

Example 7

Example 7 illustrates Example in consideration of measures against rise of the temperature of the preprocessing head 5 and the postprocessing head 6 among a plurality of same color ink heads that eject ink of the same color. The above Examples show the examples in which each of the first to sixth ink heads 4A to 4F of the respective colors includes two or three unit heads. When a difference in the number of adjacent preprocessing heads 5 or the postprocessing heads 6 is large among the unit heads, there occurs a problem that the ink ejection characteristics greatly differ among the unit heads. The present Example shows a head arrangement example in which the difference in the number of adjacent heads is reduced.

Figure 13:
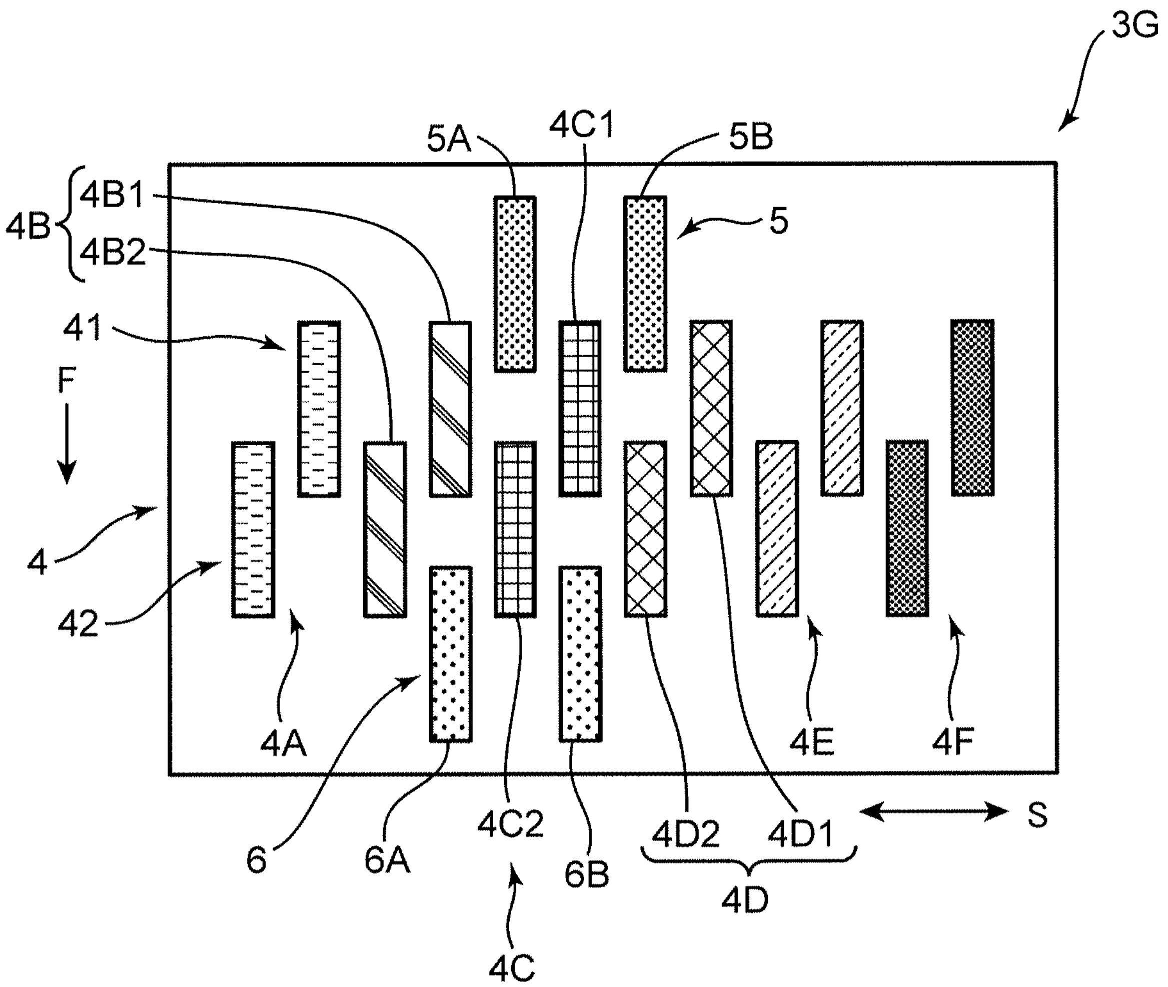
FIG. 13 is a plan view of a carriage showing head arrangement according to Example 7.

FIG. 13 is a plan view schematically showing a carriage 3G having head arrangement according to Example 7. The carriage 3G has head arrangement in which a difference between a maximum value and a minimum value of a count number is one or less, the count number being the number of the preprocessing heads 5 or the postprocessing heads 6 adjacent to each of the two unit heads (same color ink heads) of the first to sixth ink heads 4A to 4F in the main scanning direction S and the conveyance direction F.

In the head arrangement of the carriage 3G, arrangement of the ink head 4 is the same as the head arrangement of the carriage 3F as illustrated above in FIG. 12. By contrast, the preprocessing head 5 includes the first and second preprocessing heads 5A and 5B arranged side by side in the main scanning direction S with the upstream side head 4C1 of the third ink head 4C interposed therebetween. The postprocessing head 6 includes the first and second postprocessing heads 6A and 6B arranged side by side in the main scanning direction S with the downstream side head 4C2 interposed therebetween.

In such head arrangement as shown in Example 7, with the downstream side head of the first ink head 4A as one-end side head, as described above, LC=11, B1=4, 6, and B2=3, 5. In this case, |(B1−LC/2)|/LC=0.136, 0.045, which satisfy the above Formula 1. In addition, |(B2−LC/2)|/LC=0.227 or 0.045, both of which satisfy the above Formula 2. Accordingly, the variation in the time from the landing of the preprocessing solution to the landing of the ink ejected by the first ink head line 41 and the variation in the time from the landing of the ink ejected by the second ink head line 42 to the landing of the postprocessing solution can be reduced. As a result, the preprocessing solution, the ink, and the postprocessing solution can be stably and sequentially landed on the workpiece W, making image quality hardly vary on the workpiece W. Note that when B1=4, |(B1+B2−LC)/LC|=0.364 or 0.181, of which one does not satisfy the above Formula 3 and Formula 4, while the other satisfies Formula 3 and Formula 4. In addition, when B1=6, |(B1+B2−LC)/LC|=0.181 or 0, both of which satisfy the above Formula 3 and Formula 4. Accordingly, in a case where the plurality of ink head lines including the ink heads that eject the ink of the same color are mounted on the carriage 3, it is possible to suppress the situation where the variation in time from the landing of the preprocessing solution to the first landing of the ink becomes large, and moreover, the variation in time from the second landing of the ink to the landing of the postprocessing solution becomes large.

For the second ink head 4B of the carriage 3G, the count numbers of the processing heads 5 and 6 adjacent to the upstream side head 4B1 and the downstream side head 4B2 in the main scanning direction S and the conveyance direction F are two and one, respectively, and the difference is "one". For the third ink head 4C, the count number for each of the upstream side head 4C1 and the downstream side head 4C2 is three, and the difference is "zero". For the fourth ink head 4D, the count number for the upstream side head 4D1 is one, the count number for the downstream side head 4D2 is two, and the difference is "one". The remaining ink heads 4A, 4E, and 4F all have the count number of zero. Accordingly, the difference between the maximum value and the minimum value for all of the first to sixth ink heads 4A to 4F is one or less, which satisfies the above requirement.

As described in the foregoing, in Example 7, a difference between the maximum value and the minimum value of the count number is set to be one or less, the count number being the number of the processing heads 5 and 6 adjacent to each of the upstream side heads 4A1 to 4F1 and the downstream side heads 4A2 to 4F2 of the first to sixth ink heads 4A to 4F, respectively. This prevents the plurality of same color ink heads from having a large difference in the ink ejection amount.

Example 8

Figure 14:
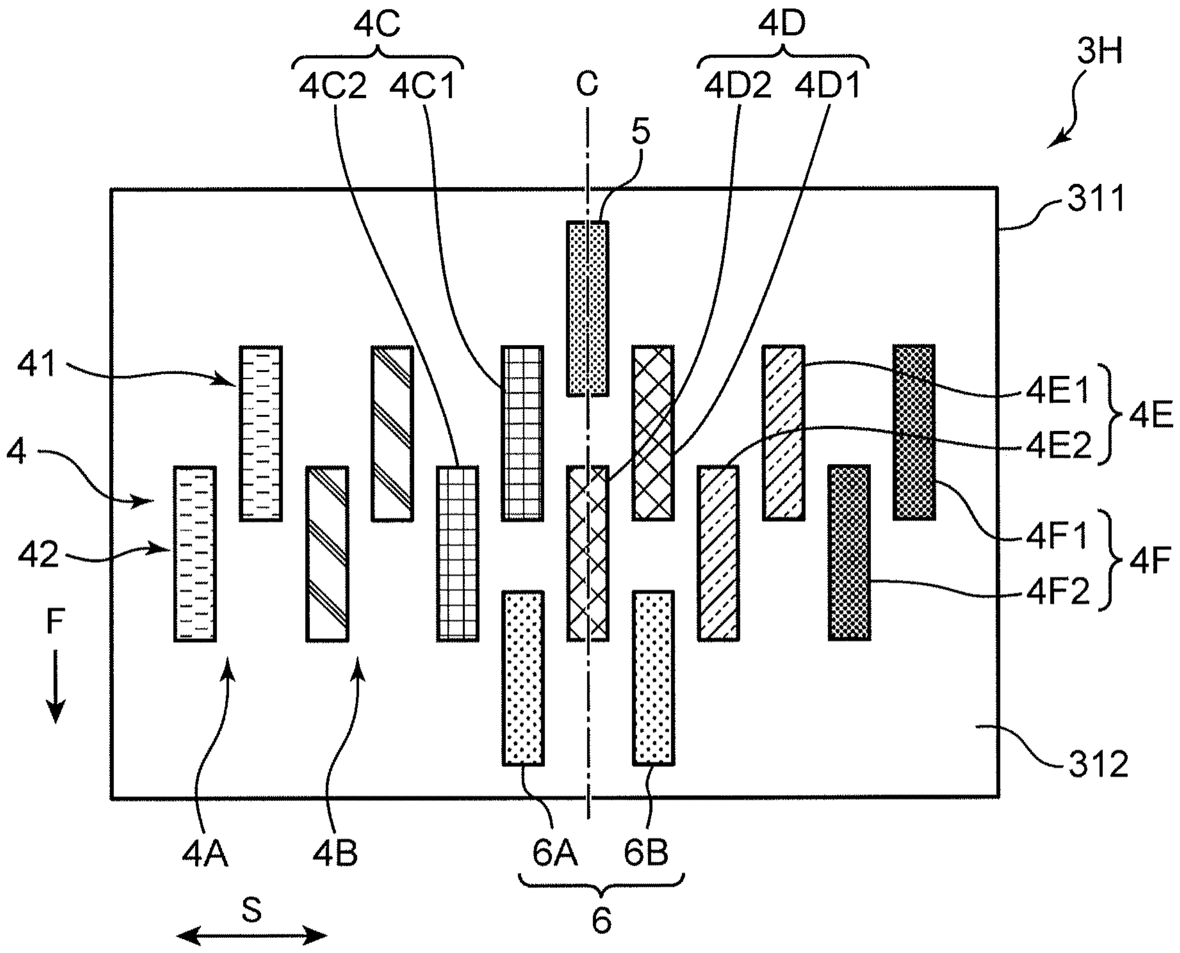
FIG. 14 is a plan view of a carriage showing head arrangement according to Example 8.

FIG. 14 is a plan view schematically showing a carriage 3H having head arrangement according to Example 8. Example 8 shows an example in which contact of the preprocessing solution and the postprocessing solution with the ink can be reduced by arranging the preprocessing head 5 and the postprocessing head 6 in a cluster as much as possible on the head support frame 31 instead of dispersedly arranging the same.

Example 8 illustrates head arrangement that satisfies the following requirements (A) to (C).

(A) In the preprocessing head 5 and the postprocessing head 6, when a larger number of the unit heads is denoted as m and a smaller number of the unit heads is denoted as n, a requirement, m=n+odd number, is satisfied, (B) arrangement or array center of one or a plurality of the preprocessing heads 5 in the main scanning direction S coincides with arrangement or array center of one or a plurality of the postprocessing heads 6 in the main scanning direction S, and (C) arrangement or array center of the preprocessing head 5 and the postprocessing head 6 coincides with the arrangement position of one of the ink heads 4 in the main scanning direction S.

The carriage 3H illustrated in FIG. 8 includes the ink head 4, one preprocessing head 5, and the postprocessing head 6 having the first and second postprocessing heads 6A and 6B. The head arrangement is the same as in FIG. 12 and the like. Therefore, the head arrangement in Example 8 also satisfies the relationships of Formula 1 to Formula 4 described above and enables the same effects to be obtained. In addition, in this example, m=2 corresponds to the postprocessing head 6 and n=1 corresponds to the preprocessing head 5. Therefore, the above requirement (A), m=n+odd number, is satisfied. The arrangement center of the preprocessing head 5 and the array center of the postprocessing head 6 are both at a center C in the drawing, which also satisfies the requirement (B). Furthermore, the center C and the arrangement position of the downstream side head 4D2 of the fourth ink head 4D coincide with each other, which also satisfies the requirement (C).

According to the head arrangement of Example 8, the preprocessing head 5 and the postprocessing head 6 can be mounted on the carriage 3H in a cluster to some extent. Thus, among the first to sixth ink heads 4A to 4F, the number of ink heads arranged at positions close to the preprocessing head 5 or the postprocessing head 6 can be reduced. Therefore, it is possible to reduce the possibility of contact of the preprocessing solution and the postprocessing solution with the ink on the carriage.

Example 9

Figure 15:
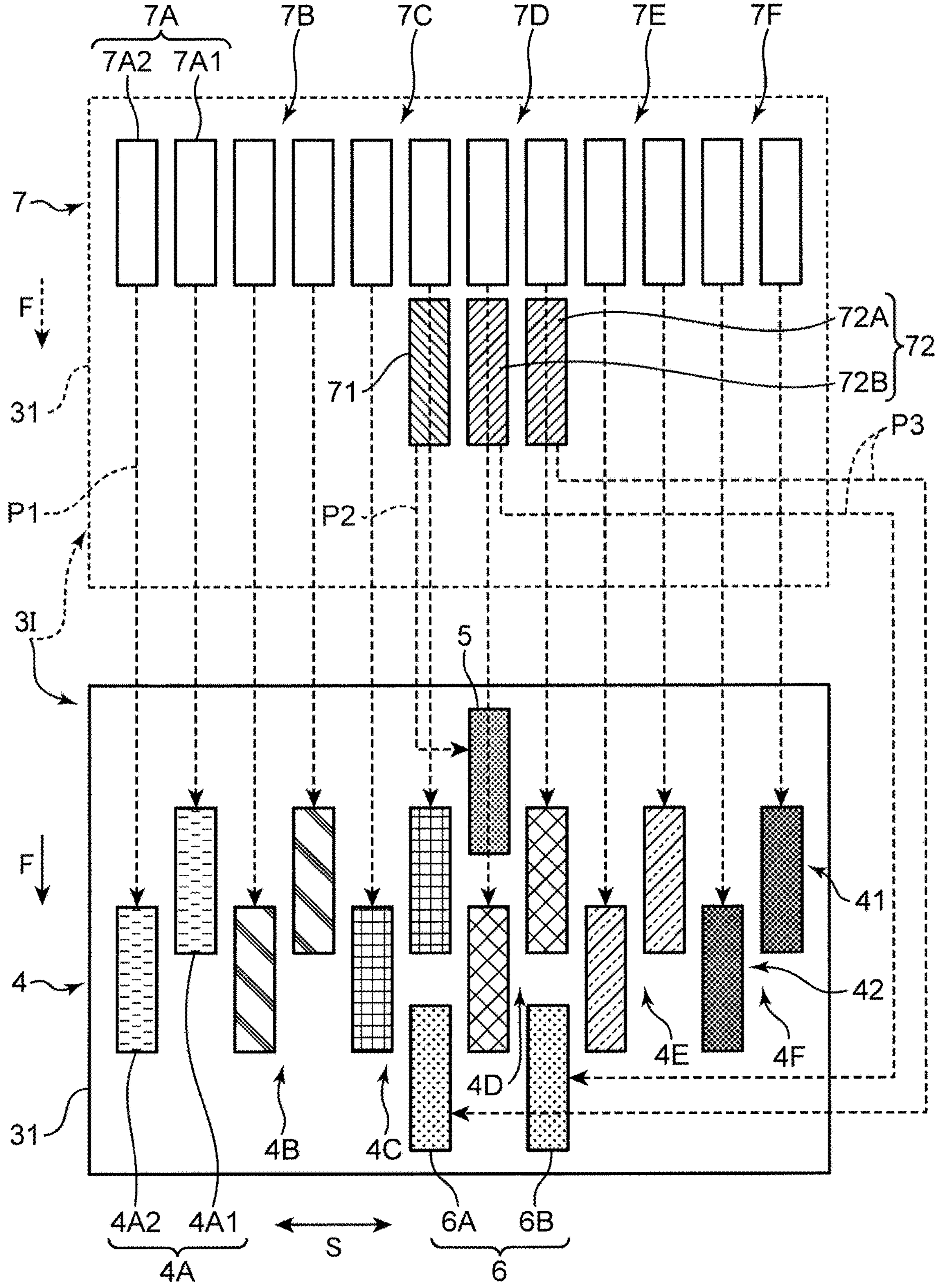
FIG. 15 is a plan view of a carriage showing head arrangement and sub-tank arrangement according to Example 9.

Example 9 illustrates a preferable arrangement relationship between the heads 4, 5, and 6 on the carriage and sub-tanks that supply the ink or the processing solution to these heads. FIG. 15 is a plan view showing a carriage 3I having head arrangement, and sub-tank arrangement according to Example 9. The carriage 3I includes the ink head 4 having the first to sixth ink heads 4A to 4F, one preprocessing head 5, and the postprocessing head 6 having the first and second postprocessing heads 6A and 6B. The head arrangement is the same as in FIG. 12 and the like. Therefore, the head arrangement in Example 9 also satisfies the relationships of Formula 1 to Formula 4 described above and enables the same effects to be obtained.

The sub-tank 7 is also mounted on the carriage 3I. The sub-tank 7 includes ink sub-tanks 7A to 7F, a preprocessing solution sub-tank 71, and a postprocessing solution sub-tank 72 (both are sub-tanks for processing solution). Ink, a preprocessing solution, and a postprocessing solution are supplied to these sub-tanks 7 from a main tank (not illustrated). The ink sub-tanks 7A to 7F supply the ink to the first to sixth ink heads 4A to 4F, respectively. For example, the first color ink is supplied from a first tank 7A1 of the ink sub-tank 7A to the upstream side head 4A1 of the first ink head 4A and from a second tank 7A2 to the downstream side head 4A2 via the pipeline P1. Similarly, the second to sixth ink heads 4B to 4F are structured to be supplied with the inks of the second to sixth colors.

An arrangement order of the ink sub-tanks 7 in the main scanning direction S is the same as the arrangement order of the ink heads 4 in the main scanning direction S, the ink heads 4 receiving supply of the inks from the ink sub-tanks 7. The ink may be supplied from one ink sub-tank 7 to the plurality of ink heads 4 that eject the inks of the same color. In this case, the ink heads 4 sharing the ink sub-tank 7 may be positioned in a cluster in the main scanning direction S. Furthermore, the ink heads 4 that eject the same ink may be arranged in a cluster in the main scanning direction S, and an order of arrangement of the ink sub-tanks 7 of the respective colors may be the same as an order of arrangement of the ink heads 4 of the respective colors in the main scanning direction S.

The preprocessing solution sub-tank 71 supplies the preprocessing solution to the preprocessing head 5 via the pipeline P2. The postprocessing solution sub-tank 72 includes a first tank 72A and a second tank 72B. The first and second tanks 72A and 72B respectively supply the postprocessing solution to the first and second postprocessing heads 6A and 6B via the pipeline P3.

The ink sub-tanks 7A to 7F are mounted on the carriage 3I so as to be aligned in the main scanning direction S. The processing solution sub-tanks 71 and 72 are arranged in the conveyance direction F at positions different from the ink sub-tanks 7A to 7F. In addition, the processing solution sub-tanks 71 and 72 are arranged side by side in the main scanning direction S. Specifically, the preprocessing solution sub-tank 71 and the first and second tanks 72A and 72B of the postprocessing solution sub-tank 72 are aligned in the main scanning direction S on the downstream side in the conveyance direction F of the ink sub-tanks 7A to 7F. Only the preprocessing solution sub-tank 71 may be arranged upstream of the ink sub-tanks 7A to 7F.

On a liquid in the sub-tank 7 mounted on the carriage 3I that reciprocates in the main scanning direction S, acceleration in the main scanning direction S acts. While the sub-tank 7 and the heads 4, 5, and 6 are connected by the pipelines P1, P2, and P3, when the sub-tanks 7 are widely distributed on the carriage 3I, an arrangement range of the pipelines P1 to P3 in the main scanning direction S is also increased. Since also the pipelines P1 to P3 are filled with the ink or the processing solution, meniscus breakdown might occur at ejection portions of the heads 4, 5, and 6 due to the influence of the acceleration.

According to the configuration of Example 9, however, the ink sub-tanks 7A to 7F are mounted on the carriage 3I so as to be aligned in the main scanning direction S similarly to the first to sixth ink heads 4A to 4F. Therefore, the ink sub-tanks 7A to 7F can be arranged in a relatively narrow range on the head support frame 31 of the carriage 3I. Similarly, the preprocessing solution sub-tank 71 and the postprocessing solution sub-tank 72 can also be arranged in a relatively narrow range on the head support frame 31 of the carriage 3I.

Furthermore, since the preprocessing solution sub-tank 71 and the postprocessing solution sub-tank 72 are arranged at positions different from the ink sub-tanks 7A to 7F in the conveyance direction F, it is possible to arrange the preprocessing solution sub-tank 71 and the postprocessing solution sub-tank 72 so as to have a small difference in position in the main scanning direction S from the processing heads to which the preprocessing solution sub-tank 71 and the postprocessing solution sub-tank 72 supply the processing solution. As a result, it is possible to reduce a distribution range in the main scanning direction S of the preprocessing solution being continuously present in the preprocessing solution sub-tank 71, the pipeline P, and the preprocessing head 5, thereby making the preprocessing solution be less affected by the acceleration. Similarly, it is possible to reduce a distribution range in the main scanning direction S of the postprocessing solution being continuously present, thereby making the postprocessing solution be less affected by the acceleration.

Similarly, the ink sub-tanks 7A to 7F and the ink heads 4 to which the ink sub-tanks 7A to 7F respectively supply ink can be arranged with a small difference in position in the main scanning direction S. This makes it possible to reduce a distribution range in the main scanning direction S of the ink continuously present, thereby making the ink be less affected by the acceleration.

Example 10

Figure 16:
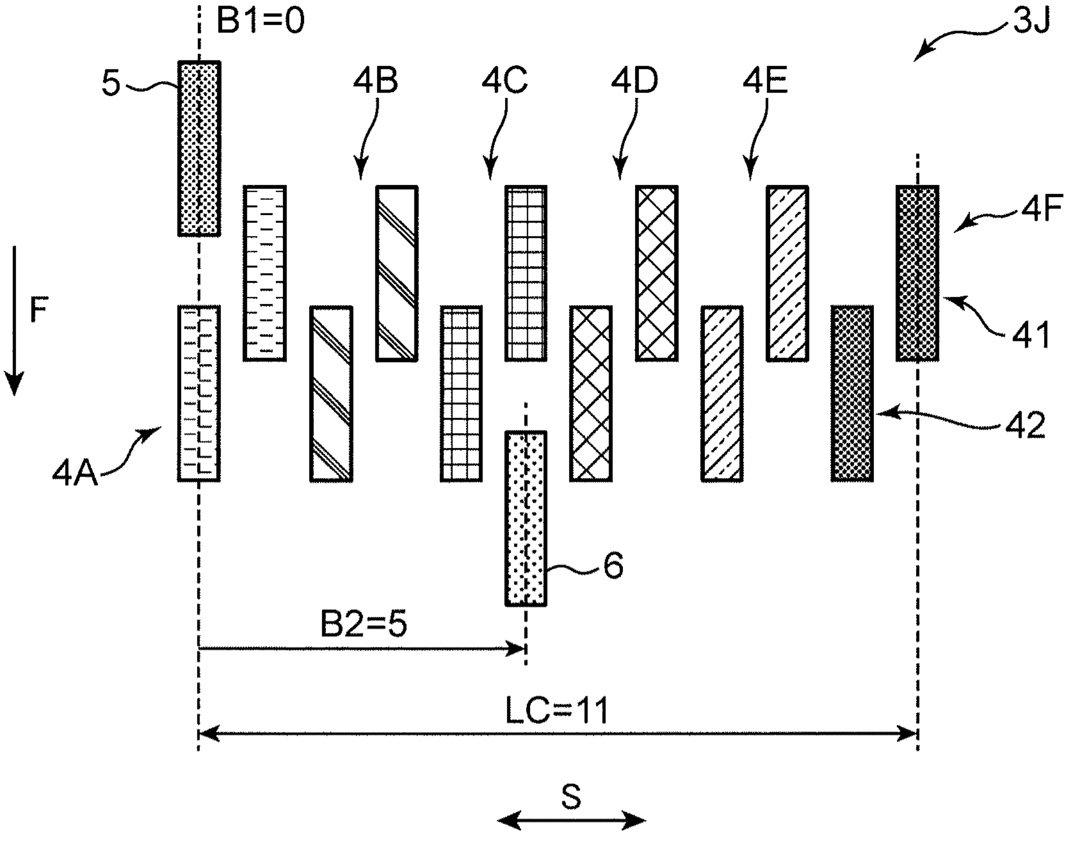
FIG. 16 is a plan view of a carriage showing head arrangement according to Example 10.

Furthermore, FIG. 16 is a plan view of a carriage 3J showing head arrangement according to Example 10. Also in Example 10, the ink head 4 has the first ink head line 41 and the second ink head line 42. In present Example, the postprocessing head 6 is located at the substantially central portion in the main scanning direction S of the array of all the heads, and the preprocessing head 5 is located at one end portion (a left end portion in FIG. 16) of the array. In this case, the downstream side head of the first ink head 4A and the preprocessing head 5 correspond to the one-end side head.

The head arrangement is set to have LC=11, B1=10, and B2=5. In this case, $|(B1-LC/2)|/LC=0.5$, which does not satisfy the above Formula 1. On the other hand, $|(B2-LC/2)|/LC=0.045$, which satisfies the above Formula 2. Such head arrangement is suitable in a case where, in terms of the function of the preprocessing solution, a variation in time from the landing of the preprocessing solution to the landing of the ink ejected by the first ink head line 41 has tolerance, while a variation in time from the landing of the ink ejected by the second ink head line 42 to the landing of the postprocessing solution should be reduced.

Example 11

Figure 17:
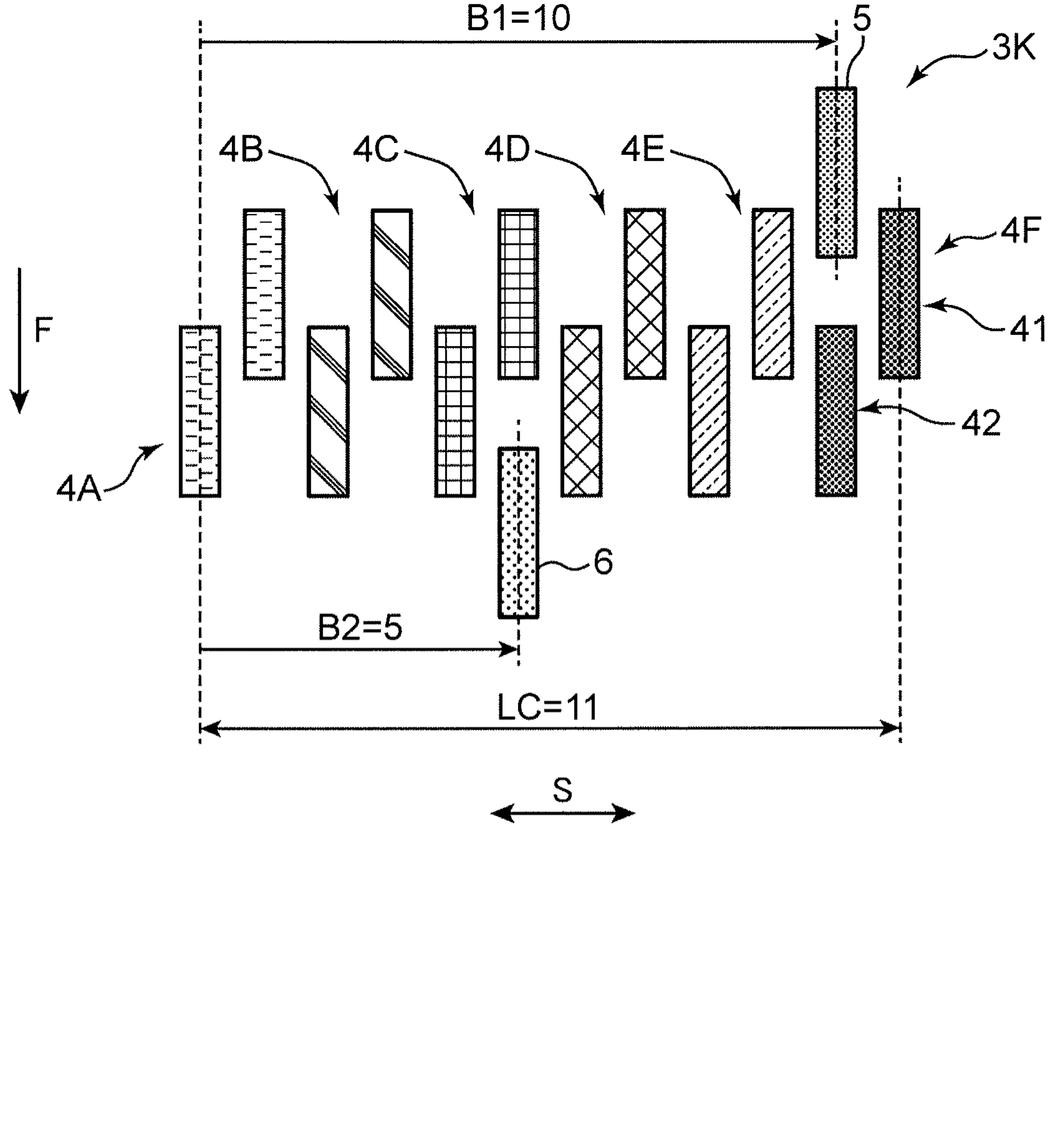
FIG. 17 is a plan view of a carriage showing head arrangement according to Example 11.

Furthermore, FIG. 17 is a plan view of a carriage 3K showing head arrangement according to Example 11. Also in Example 11, the ink head 4 has the first ink head line 41 and the second ink head line 42. In present Example, the postprocessing head 6 is located at the substantially central portion in the main scanning direction S of the array of all the heads, and the preprocessing head 5 is located at the other end portion (a right end portion in FIG. 17) of the array. In this case, the downstream side head of the first ink head 4A corresponds to the one-end side head.

The head arrangement is set to have LC=11, B1=10, and B2=5. In this case, $|(B1-LC/2)|/LC=0.409$, which does not satisfy the above Formula 1. On the other hand, $|(B2-LC/2)|/LC=0.045$, which satisfies the above Formula 2. Similarly to Example 10, such head arrangement is also suitable in a case where, in terms of the function of the preprocessing solution, a variation in time from the landing of the preprocessing solution to the landing of the ink ejected by the first ink head line 41 has tolerance, while a variation in time from the landing of the ink ejected by the second ink head line 42 to the landing of the postprocessing solution should be reduced.

Conversely to Examples 10 and 11, the arrangement of the preprocessing head 5 may satisfy Formula 1, while the arrangement of the postprocessing head 6 may not satisfy Formula 2. In this case, this head arrangement is suitable in a case where, in terms of the function of the postprocessing solution, a variation in time from the landing of the ink ejected by the second ink head line 42 to the landing of the postprocessing solution has tolerance, while a variation in time from the landing of the preprocessing solution to the landing of the ink ejected by the first ink head line 41 should be reduced.

<Inkjet Recording Method>

As described above, the inkjet printer 1 described in each Example includes one ink head line mounted at a predetermined position in the conveyance direction F on the carriage 3 or the plurality of ink head lines mounted on the carriage 3 so as to be aligned in the conveyance direction F, the preprocessing head, and the postprocessing head. Each of the one or plurality of ink head lines includes a plurality of ink heads that are arranged side by side in the main scanning direction S and eject inks for image formation. The preprocessing head 5 is arranged upstream of the one or plurality of ink head lines in the conveyance direction F and ejects a non-coloring preprocessing solution. The postprocessing head 6 is arranged downstream of the one or plurality of ink head lines in the conveyance direction F and ejects a non-coloring postprocessing solution.

Then, one inkjet recording method in the inkjet printer 1 described above includes: arranging the preprocessing head 5 so as to satisfy a relationship of $|(B1-LC/2)|/LC\leq 1/4$ . . . (Formula 1) in a case where among the plurality of ink heads 4 and the processing heads (the preprocessing head 5 and the postprocessing head 6), a head arranged closest to one end in the main scanning direction S is defined as a one-end side head, a head arranged closest to another end is defined as an other-end side head, a distance from the one-end side head to the other-end side head in the main scanning direction S is defined as LC, and a distance from the one-end side head to the preprocessing head 5 in the main scanning direction S is defined as B1; ejecting a preprocessing solution from the preprocessing head 5 to a predetermined recording region on the workpiece W while moving the carriage 3 in the main scanning direction S; and feeding the workpiece W at a predetermined feed pitch in the conveyance direction F, and ejecting ink from the ink head 4 to the recording region that has received the ejected preprocessing solution while moving the carriage 3 in the main scanning direction S.

According to such a method, it is possible to efficiently form an image on the workpiece W by the inkjet printer 1 in which heads for ejecting the preprocessing solution and the ink are mounted on one carriage 3. In addition, since the preprocessing head 5 and the ink head 4 are sequentially arranged in the conveyance direction F, the preprocessing solution and the ink can be ejected to a recording medium in a desirable landing order. Furthermore, by appropriately arranging the preprocessing head 5 so as to satisfy Formula 1, it is possible to reduce a variation in time from the landing of the preprocessing solution to the landing of the ink. As a result, variations in image quality hardly occur on the workpiece W.

In the above method, the preprocessing head 5 may be only a processing head that is mounted on the carriage 3. In addition, in the above method, recording may be ended without applying the postprocessing solution, or the postprocessing solution may be applied after the printing by the carriage 3 is ended. In the latter case, for example, the postprocessing solution is applied to substantially the entire surface of the workpiece W by spraying, transfer with a roller, immersion of the workpiece into the postprocessing solution, or the like.

In addition, another inkjet recording method in the inkjet printer 1 described above includes: arranging the postprocessing head 6 so as to satisfy a relationship of $|(B2-LC/2)|/LC\leq 1/4$ . . . (Formula 2); ejecting ink from the ink head 4 to a predetermined recording region on the workpiece W while moving the carriage 3 in the main scanning direction S; and feeding the workpiece W at the feed pitch in the conveyance direction F, and ejecting a postprocessing solution from the postprocessing head 6 to the recording region that has received the ejected ink while moving the carriage 3 in the main scanning direction S.

Such a method also makes it possible to efficiently form an image on the workpiece W by the inkjet printer 1 in which heads for ejecting the ink and the postprocessing solution are mounted on one carriage. In addition, since the ink head 4 and the postprocessing head 6 are sequentially arranged in the conveyance direction, the ink and the postprocessing solution can be ejected to the workpiece W in a desirable landing order. Furthermore, by appropriately arranging the postprocessing head 6 so as to satisfy Formula 2, it is possible to reduce a variation in time from the landing of the ink to the landing of the postprocessing solution. As a result, variations in image quality hardly occur on the workpiece W.

Note that in the above method, the postprocessing head 6 may be only a processing head that is mounted on the carriage 3. In addition, in the above method, recording may be ended without applying the preprocessing solution, or the preprocessing solution may be applied before the printing by the carriage 3. In the latter case, for example, the preprocessing solution is applied to substantially the entire surface of the workpiece W by spraying, transfer with a roller, immersion of the workpiece into the preprocessing solution, or the like.

In addition, another inkjet recording method in the inkjet printer 1 described above includes: arranging the preprocessing head 5 and the postprocessing head 6 on the carriage 3 so as to satisfy Formula 1 and Formula 2; ejecting a preprocessing solution from the preprocessing head 5 to a predetermined recording region on the workpiece W while moving the carriage 3 in the main scanning direction S; feeding the workpiece W at a predetermined feed pitch in the conveyance direction F, and ejecting ink from the ink head 4 to the recording region received the ejected preprocessing solution while moving the carriage 3 in the main scanning direction S; ejecting the ink from the ink head 4 to the recording region received the ejected preprocessing solution; ejecting the ink from the ink head 4 to the recording region received the ejected preprocessing solution; and further feeding the workpiece W at the feed pitch in the conveyance direction F, and ejecting a postprocessing solution from the postprocessing head 6 to the recording region that has received the ejected ink while moving the carriage 3 in the main scanning direction S.

By such method, it is possible to efficiently form an image on a workpiece W by the all-in-one inkjet printer 1 in which three kinds of heads for ejecting the preprocessing solution, the ink, and the postprocessing solution are mounted on one carriage 3. In addition, since the preprocessing head 5, the ink head 4, and the postprocessing head 6 are sequentially arranged in the conveyance direction F, the preprocessing solution, the ink, and the postprocessing solution can be ejected to a recording medium in a desirable landing order. Furthermore, by appropriately arranging the preprocessing head 5 and the postprocessing head 6 so as to satisfy Formula 1 and Formula 2, it is possible to reduce a variation in time from the landing of the preprocessing solution to the landing of the ink and time from the landing of the ink to the landing of the postprocessing solution. As a result, variations in image quality hardly occur on the workpiece W.

Comparative Example

Figure 18:
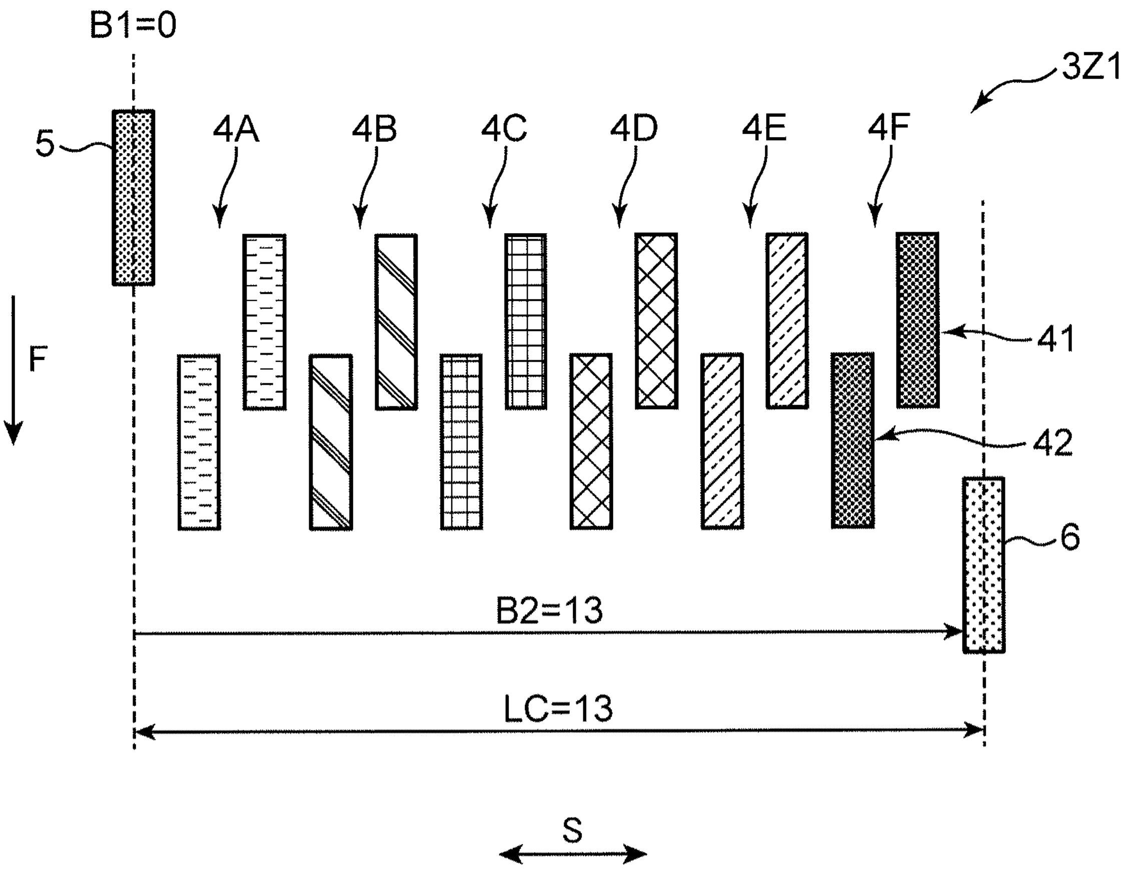
FIG. 18 is a plan view of a carriage showing head arrangement according to Comparative Example 1 to be compared with the present disclosure.

FIG. 18 is a plan view of a carriage 3Z1 showing head arrangement according to Comparative Example 1 to be compared with the present disclosure. In such head arrangement in Comparative Example 1, LC=13, B1=0, and B2=13. In this case, $|(B1-LC/2)|/LC=0.409$, which does not satisfy the above Formula 1. In addition, $|(B2-LC/2)|/LC=0.682$, which does not satisfy the above Formula 2.

Figure 19:
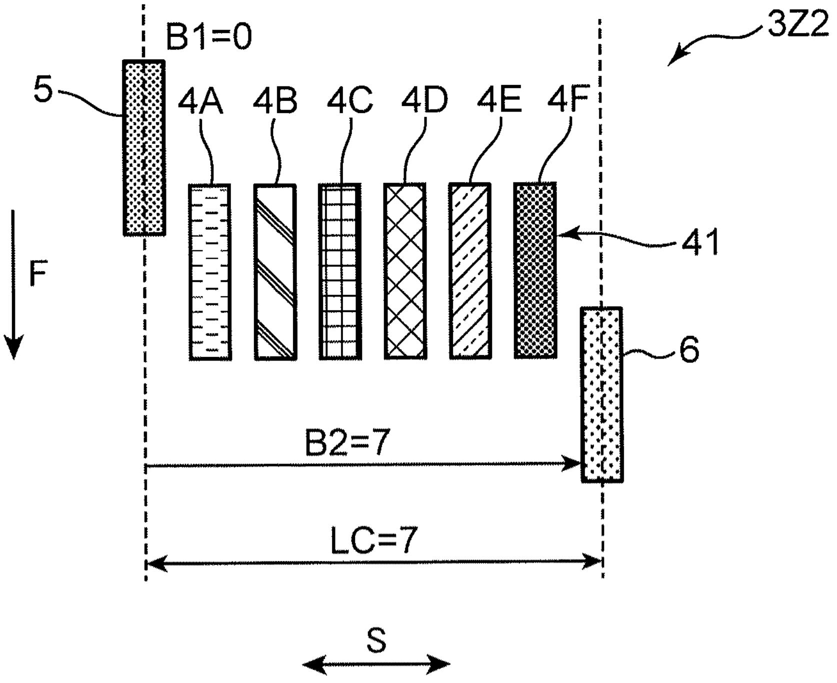
FIG. 19 is a plan view of a carriage showing head arrangement according to Comparative Example 2 to be compared with the present disclosure.

Similarly, FIG. 19 is a plan view of a carriage 3Z2 showing head arrangement according to Comparative Example 2 to be compared with the present disclosure. In such head arrangement in Comparative Example 2, LC=7, B1=0, and B2=7. In this case, $|(B1-LC/2)|/LC=0.5$, which does not satisfy the above Formula 1. In addition, $|(B2-LC/2)|/LC=0.5$, which does not satisfy the above Formula 2.

In such head arrangements as shown in Comparative Examples 1 and 2, while a variation in time from the landing of the preprocessing solution to the landing of the ink ejected by the first ink head line 41 is increased, a variation in time from the landing of the ink ejected by the second ink head line 42 to the landing of the postprocessing solution is also increased, resulting in that images formed on the workpiece W are liable to vary.

CONCLUSION OF PRESENT DISCLOSURE

An inkjet recording device according to one aspect of the present disclosure includes a conveyance unit, a carriage, one or a plurality of ink head lines, and a processing head. The conveyance unit is configured to convey a recording medium in a conveyance direction. The carriage is configured to reciprocate in a main scanning direction intersecting the conveyance direction. The one or plurality of ink head lines are located on the carriage at a position in the conveyance direction. The processing head is located on the carriage and configured to eject a non-coloring processing solution. The one or plurality of ink head lines includes a plurality of ink heads. The plurality of ink heads is arranged side by side in the main scanning direction and configured to eject inks for image formation respectively. The processing head includes a preprocessing head. The preprocessing head is arranged on an upstream side of the one or plurality of ink head lines in the conveyance direction and is configured to eject a preprocessing solution as the processing solution. The preprocessing head is arranged to satisfy a relationship of Formula 1 in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the preprocessing head in the main scanning direction is defined as B1. $|(B1-LC/2)|/LC \leq 1/4$ . . . (Formula 1)

According to the present configuration, it is possible to provide an inkjet recording device in which heads for ejecting a preprocessing solution and ink are located on one carriage. In addition, since the preprocessing head and the ink head are sequentially arranged in the conveyance direction, the preprocessing solution and the ink can be ejected to a recording medium in a desirable landing order. Furthermore, by appropriately arranging the preprocessing head so as to satisfy Formula 1, it is possible to reduce a variation in the time from the landing of the preprocessing solution to the landing of the ink regardless of the moving direction of the carriage. As a result, by sequentially landing the preprocessing solution and the ink on the recording medium, variations in image quality hardly occur on the recording medium.

In the above configuration, a plurality of the preprocessing heads may be arranged side by side in the main scanning direction, and at least one of the plurality of preprocessing heads may be arranged so as to satisfy the relationship of the Formula 1.

According to the present configuration, even when the plurality of preprocessing heads are arranged, arranging at least one of the preprocessing heads so as to satisfy Formula 1 enables reduction in a variation in the time from the landing of the preprocessing solution to the landing of the ink. In addition, since the preprocessing solution can be further ejected from other preprocessing head, an ejectable amount of the processing solution can be increased.

In the above configuration, all of the plurality of preprocessing heads may be arranged so as to satisfy the relationship of the Formula 1.

According to the present configuration, by arranging all the plurality of preprocessing heads so as to satisfy Formula 1, a variation in the time from the landing of the preprocessing solution to the landing of the ink can be reduced, and an ejectable amount of the processing solution can be increased.

In the above configuration, the processing head may further include, as the processing head, a postprocessing head arranged on a downstream side of the one or plurality of ink head lines in the conveyance direction and the postprocessing head is configured to eject a post-ejection solution as the processing solution, in which a plurality of the ink head lines may be arranged side by side in the conveyance direction, one ink head line among the plurality of ink head lines may have one ink head configured to eject ink of a color, and other ink head line among the plurality of ink head lines may have other ink head arranged adjacent to the one ink head and configured to eject the ink of the color, and in a case where a distance in the main scanning direction from the one-end side head to the postprocessing head is defined as B2, the preprocessing head and the postprocessing head may be arranged so as to satisfy a relationship of the following Formula. $|(B1+B2-LC)/LC|\leq 1/2$ According to the present configuration, it is possible to provide an all-in-one inkjet recording device in which three kinds of heads for ejecting the preprocessing solution, the ink, and the postprocessing solution are located on one carriage. In addition, since the preprocessing head, the ink head, and the postprocessing head are sequentially arranged in the conveyance direction, the preprocessing solution, the ink, and the postprocessing solution can be ejected to a recording medium in a desirable landing order. Furthermore, in the configuration in which inks of the same color are ejected from the ink heads of the plurality of ink head lines to a predetermined ejection target region, it is possible to make both variations hardly become large, a variation in the time from the landing of the preprocessing solution to the landing of the ink ejected by the ink head on the upstream side in the conveyance direction and a variation in the time from the landing of the ink ejected by the ink head on the downstream side in the conveyance direction to the landing of the postprocessing solution.

An inkjet recording device according to another aspect of the present disclosure includes a conveyance unit configured to convey a recording medium in a conveyance direction; a carriage configured to reciprocate in a main scanning direction intersecting the conveyance direction; one or a plurality of ink head lines located on the carriage at a position in the conveyance direction; and a processing head located on the carriage and configured to eject a non-coloring processing solution, in which the one or each of the plurality of ink head lines includes a plurality of ink heads, wherein the plurality of ink heads is arranged side by side in the main scanning direction and is configured to eject inks for image formation respectively, the processing head includes a postprocessing head, wherein the postprocessing head is arranged on a downstream side of the one or plurality of ink head lines in the conveyance direction and is configured to eject a postprocessing solution as the processing solution, and the postprocessing head is arranged to satisfy a relationship of Formula 2 in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the postprocessing head in the main scanning direction is defined as B2. $|(B2-LC/2)|/LC\leq 1/4$ . . . (Formula 2)

According to the present configuration, it is possible to provide an inkjet recording device in which heads for ejecting ink and a postprocessing solution are located on one carriage. In addition, since the ink head and the postprocessing head are sequentially arranged in the conveyance direction, the ink and the postprocessing solution can be ejected to a recording medium in a desirable landing order. Furthermore, by appropriately arranging the postprocessing head so as to satisfy Formula 2, it is possible to reduce a variation in the time from the landing of the ink to the landing of the postprocessing solution regardless of the moving direction of the carriage. As a result, variations in image quality hardly occur on the recording medium.

In the above configuration, a plurality of the postprocessing heads may be arranged side by side in the main scanning direction, and at least one of the plurality of postprocessing heads may be arranged so as to satisfy the relationship of the Formula 2.

According to the present configuration, even when the plurality of postprocessing heads are arranged, arranging at least one of the postprocessing heads to satisfy Formula 2 enables reduction in a variation in the time from the landing of the ink to the landing of the postprocessing solution. In addition, since the postprocessing solution can be further ejected from other postprocessing head, an ejectable amount of the processing solution can be increased.

In the above configuration, all of the plurality of postprocessing heads may be arranged to satisfy the relationship of Formula 2.

According to the present configuration, by arranging all the plurality of postprocessing heads so as to satisfy Formula 2, a variation in the time from the landing of the ink to the landing of the postprocessing solution can be reduced, and an ejectable amount of the processing solution can be increased.

In the above configuration, the processing head may further includes a preprocessing head, wherein the preprocessing head is arranged on an upstream side of the one or plurality of ink head lines in the conveyance direction and is configured to eject a preprocessing solution as the processing solution, a plurality of the ink head lines may be arranged side by side in the conveyance direction, one ink head line among the plurality of ink head lines may have one ink head configured to eject ink of a predetermined color, other ink head line among the plurality of ink head lines may have other ink head arranged adjacent to the one ink head and configured to eject the ink of the predetermined color, and in a case where a distance in the main scanning direction from the one-end side head to the preprocessing head is defined as B1, the preprocessing head and the postprocessing head may be arranged so as to satisfy a relationship of the following Formula. $|(B1+B2-LC)/LC|\leq 1/2$ According to the present configuration, in a configuration in which inks of the same color are ejected from the ink heads of the plurality of ink head lines to a predetermined ejection target region, it is possible to suppress both variations from becoming large, a variation in the time from the landing of the preprocessing solution to the landing of the ink ejected by the ink head on the upstream side in the conveyance direction and a variation in the time from the landing of the ink ejected by the ink head on the downstream side in the conveyance direction to the landing of the postprocessing solution.

In the above configuration, the processing head may further includes a preprocessing head wherein the preprocessing head is arranged on an upstream side of the one or plurality of ink head lines in the conveyance direction and is configured to eject a preprocessing solution as the processing solution, in which in a case where a distance in the main scanning direction from the one-end side head to the preprocessing head is defined as B1, the preprocessing head may be arranged to satisfy a relationship of the following Formula. $|(B1-LC/2)|/LC\leq 1/4$ According to the present configuration, by appropriately arranging the preprocessing head so as to satisfy the above Formula, it is possible to further reduce a variation in the time from the landing of the preprocessing solution to the landing of the ink.

In the above configuration, a plurality of the ink head lines may be arranged side by side in the conveyance direction, one ink head line among the plurality of ink head lines may have one ink head configured to eject ink of a color, and other ink head line among the plurality of ink head lines may have other ink head arranged adjacent to the one ink head and configured to eject the ink of the color, and the preprocessing head and the postprocessing head may be arranged to satisfy a relationship of the following Formula. $|(B1+B2-LC)/LC|\leq 1/3$ According to the present configuration, in a configuration in which inks of the same color are ejected from the ink heads of the plurality of ink head lines to a predetermined ejection target region, it is possible to suppress both variations from becoming large, a variation in the time from the landing of the preprocessing solution to the landing of the ink ejected by the ink head on the upstream side in the conveyance direction and a variation in the time from the landing of the ink ejected by the ink head on the downstream side in the conveyance direction to the landing of the postprocessing solution.

In the above configuration, the processing head may be arranged in a range of an arrangement width of the plurality of ink heads in the main scanning direction.

According to this inkjet recording device, even when the processing head is located on the carriage, it is not necessary to extend a width of the carriage in the main scanning direction. Accordingly, the width of the carriage in the main scanning direction can be reduced.

In the above configuration, the processing head may be arranged to be partially interposed between a pair of adjacent ink heads in the main scanning direction among the plurality of ink heads included in the one ink head line.

According to this inkjet recording device, the ink heads and the processing heads arranged at different positions in the conveyance direction (sub-scanning direction) can be arranged at high density in the conveyance direction. Accordingly, a width of the carriage in the conveyance direction can be reduced.

In the above configuration, the processing head may be arranged to be partially adjacent to the ink head in the main scanning direction and the conveyance direction, the plurality of ink heads may include a plurality of same color ink heads configured to eject inks of a same color, and for each of the same color ink heads, when the number of processing heads adjacent in the main scanning direction and the conveyance direction is counted out of the processing heads, a difference between a maximum value and a minimum value of the count numbers may be one or less.

Generally, a head that ejects liquid by a jet method generates heat for pressurizing the liquid using electricity. In particular, unlike an ink head that performs ejection operation only when forming necessary color dots, a processing head that requires ejection operation corresponding to dots of all colors is likely to have a higher temperature. An ink head adjacent to such a processing head is likely to have a high temperature, and might have a larger difference in an ink ejection amount than that of an ink head not adjacent to the processing head. As described above, by setting, to one or less, the difference between the maximum value and the minimum value of the count number of the processing heads adjacent to each of the same color ink heads, a large difference in the ink ejection amount hardly occurs among the plurality of same color ink heads.

In the above configuration, the processing head may be arranged to be partially adjacent to the ink head in the main scanning direction and the conveyance direction, the plurality of ink heads may include at least a first ink head configured to eject ink of a first color and a second ink head configured to eject ink of a second color, and when the number of the adjacent processing heads is larger for the first ink head than for the second ink head, the first ink head may eject, as the ink of the first color, ink having a smaller viscosity change due to temperature than the ink of the second color.

According to this inkjet recording device, the first ink head having a large number of adjacent processing heads ejects ink having a small viscosity change due to temperature. Accordingly, even when the first ink head is heated by the processing head, change of the ejection amount and the ejection speed of the ink of the first color caused by the temperature can be reduced.

In the above configuration, the processing head may be arranged in a central region in an arrangement width of the ink head line in the main scanning direction.

Alternatively, the processing head may include a preprocessing head arranged on an upstream side of the one or plurality of ink head lines in the conveyance direction and configured to eject a preprocessing solution as the processing solution, and a postprocessing head arranged on a downstream side of the one or plurality of ink head lines in the conveyance direction and configured to eject a postprocessing solution as the processing solution, in which the preprocessing head and the postprocessing head may be arranged such that an arrangement or array center of one or a plurality of the preprocessing heads and an arrangement or array center of one or a plurality of the postprocessing heads in the main scanning direction coincide with each other in the main scanning direction.

According to these inkjet recording devices, it is possible to particularly reduce a variation in time from landing of the preprocessing solution on the recording medium to landing of the ink and a variation in time from landing of the ink to landing of the postprocessing solution at each main scanning position.

In the above inkjet recording device, of the preprocessing head and the postprocessing head, when a larger number of the heads is denoted as m and a smaller number of the heads is denoted as n, a requirement, m=n+odd number, may be satisfied, and the arrangement or array center of the preprocessing head and the postprocessing head may coincide with an arrangement position of one of the plurality of ink heads in the main scanning direction.

According to this inkjet recording device, the preprocessing head and the postprocessing head can be located on the carriages in a cluster to some extent. Thus, among the plurality of ink heads, the number of ink heads arranged at positions close to the processing head can be reduced. Accordingly, it is possible to reduce the possibility of contact of the preprocessing solution and the postprocessing solution with the ink on the carriage.

The processing head may include a preprocessing head arranged on an upstream side of the one or plurality of ink head lines in the conveyance direction and configured to eject a preprocessing solution as the processing solution, and a postprocessing head arranged on a downstream side of the one or plurality of ink head lines in the conveyance direction and configured to eject a postprocessing solution as the processing solution, and the inkjet recording device may further include a holding member configured to hold the carriage in a state of being reciprocable in the main scanning direction, in which the carriage may include an engagement portion and may be held at the holding member in a cantilevered state by the engagement portion, and the preprocessing head may be arranged closer to the engagement portion than the postprocessing head in the conveyance direction.

According to this inkjet recording device, the carriage can be supported with a simple structure by causing the holding member to cantilever the carriage. In addition, cantilever support easily realizes a structure in which one side of the carriage is opened, and facilitates maintenance of the ink head and the processing head. When the carriage is cantilevered, it is assumed that the accuracy in the height direction decreases on the side of the carriage far from the engagement portion. However, since the postprocessing head having tolerance for a demand for ejection accuracy is located on the side far from the engagement portion, a great influence will be hardly exerted on image quality.

The processing head may include a preprocessing head arranged on an upstream side of the one or plurality of ink head lines in the conveyance direction and configured to eject a preprocessing solution as the processing solution, and a postprocessing head arranged on a downstream side of the one or plurality of ink head lines in the conveyance direction and configured to eject a postprocessing solution as the processing solution, and the inkjet recording device may further include a holding member configured to hold the carriage in a state of being reciprocable in the main scanning direction, in which the carriage may include an engagement portion and is held at the holding member in a cantilevered state by the engagement portion, and of the preprocessing head and the postprocessing head, a head having a smaller number of the heads may be arranged on an engagement portion side of the carriage.

As described above, the processing head generates heat by the ejection operation. For this reason, the carriage on which the processing head is located is heated, which may cause thermal deformation of the carriage and a holding structure thereof. In a mode in which the carriage is cantilevered, the thermal deformation might affect ink landing accuracy. According to the above configuration, the number of the processing heads arranged on the proximal end portion side can be reduced, and the influence of thermal deformation can be reduced.

The above inkjet recording device may further include a holding member configured to hold the carriage in a state of being reciprocable in the main scanning direction, in which the carriage may include an engagement portion and may be held at the holding member in a cantilevered state by the engagement portion, and of a head array of the ink heads and the processing head, a head arranged at a side closest to the engagement portion of the carriage may be the processing head being arranged at a position excluding an end of the head array in the main scanning direction.

According to this inkjet recording device, in the head array (head arrangement region), a head arranged on the side closest to the engagement portion is the processing head which is not arranged at the end of the head array in the main scanning direction. Generally, an end in the main scanning direction is closest to an end portion (corner) of the carriage. When thermal deformation occurs in the vicinity of the proximal end portion which is the end portion of the carriage, positional accuracy of the head mounted on the carriage decreases. The above configuration makes such problem hardly occur.

The above inkjet recording device may further include a plurality of ink sub-tanks configured to supply the ink to each of the plurality of ink heads; and a processing solution sub-tank configured to supply the processing solution to the processing head, in which the plurality of ink sub-tanks may be located on the carriage to be aligned in the main scanning direction, and the processing solution sub-tank may be located on the carriage at a position different from the plurality of ink sub-tanks in the conveyance direction.

According to the above configuration, since the ink sub-tank and the processing head sub-tank are arranged at different positions in the conveyance direction, the sub-tanks can be arranged in a relatively narrow range on the carriage. Acceleration in the main scanning direction acts on liquid in the sub-tank located on the carriage that reciprocates in the main scanning direction. Although the sub-tank and the head are connected by a predetermined pipeline, since when the sub-tanks are widely distributed on the carriage, an arrangement range of the pipeline in the main scanning direction also increases, the influence of the acceleration increases, so that meniscus breakdown might occur at an ejection portion of the head. The above configuration makes it possible to relatively narrow the arrangement range of the pipeline in the main scanning direction.

In addition, an inkjet recording method according to yet another aspect of the present disclosure is an inkjet recording method of an inkjet recording device including: a conveyance unit configured to convey a recording medium in a conveyance direction; a carriage configured to reciprocate in a main scanning direction intersecting the conveyance direction; one or a plurality of ink head lines located on the carriage at a position in the conveyance direction; and a processing head located on the carriage and configured to eject a non-coloring processing solution, in which the one or each of the plurality of ink head lines includes a plurality of ink heads arranged side by side in the main scanning direction and configured to eject inks for image formation, and as the processing head, a preprocessing head arranged on an upstream side of the one or plurality of ink head lines in the conveyance direction is provided and the preprocessing head is configured to eject a preprocessing solution as the processing solution, the inkjet recording method including: arranging the preprocessing head to satisfy a relationship of $|(B1-LC/2)|/LC \leq 1/4$ . . . (Formula 1) in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the preprocessing head in the main scanning direction is defined as B1; ejecting the preprocessing solution from the preprocessing head to a predetermined recording region on the recording medium while moving the carriage in the main scanning direction; feeding the recording medium in the conveyance direction, and ejecting the ink from the ink head to the recording region received the ejected preprocessing solution while moving the carriage in the main scanning direction.

According to the present method, it is possible to efficiently form an image on a recording medium by an inkjet recording device in which heads for ejecting the preprocessing solution and the ink are located on one carriage. In particular, since the preprocessing head and the ink head are sequentially arranged in the conveyance direction, the preprocessing solution and the ink can be ejected to a recording medium in a desirable landing order. Furthermore, by appropriately arranging the preprocessing head so as to satisfy Formula 1, it is possible to reduce a variation in the time from the landing of the preprocessing solution to the landing of the ink regardless of the moving direction of the carriage. As a result, variations in image quality hardly occur on the recording medium.

Furthermore, an inkjet recording method according to still another aspect of the present disclosure is an inkjet recording method of an inkjet recording device including: a conveyance unit configured to convey a recording medium in a predetermined conveyance direction; a carriage configured to reciprocate in a main scanning direction intersecting the conveyance direction; one or a plurality of ink head lines located on the carriage at a position in the conveyance direction; and a processing head located on the carriage and configured to eject a non-coloring processing solution, in which the one or each of the plurality of ink head lines includes a plurality of ink heads arranged side by side in the main scanning direction and configured to eject inks for image formation, and as the processing head, a postprocessing head arranged on a downstream side of the one or plurality of ink head lines in the conveyance direction is provided and the postprocessing head is configured to eject a postprocessing solution as the processing solution, the inkjet recording method including: arranging the postprocessing head to satisfy a relationship of $|(B2-LC/2)|/LC \leq 1/4$ . . . (Formula 2) in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the postprocessing head in the main scanning direction is defined as B2; ejecting the ink from the ink head to a predetermined recording region on the recording medium while moving the carriage in the main scanning direction; and further feeding the recording medium in the conveyance direction, and ejecting the postprocessing solution from the postprocessing head to the recording region received the ejected ink while moving the carriage in the main scanning direction.

According to the present method, it is possible to efficiently form an image on a recording medium by an inkjet recording device in which heads for ejecting the ink and the postprocessing solution are located on one carriage. In particular, since the ink head and the postprocessing head are sequentially arranged in the conveyance direction, the ink and the postprocessing solution can be ejected to a recording medium in a desirable landing order. Furthermore, by appropriately arranging the postprocessing head to satisfy Formula 2, it is possible to reduce a variation in the time from the landing of the ink to the landing of the postprocessing solution regardless of the moving direction of the carriage. As a result, variations in image quality hardly occur on the recording medium.

According to the present disclosure, it is possible to provide an inkjet recording device that includes a carriage on which an ink head and a processing head are located and which moves in a main scanning direction, and that enables reduction of a variation in time from landing of ink to landing of a processing solution, and an inkjet recording method thereof.

The invention claimed is:

1. An inkjet recording device, comprising:

a conveyance unit configured to convey a recording medium in a conveyance direction;

a carriage configured to reciprocate in a main scanning direction intersecting the conveyance direction;

a plurality of ink head lines located on the carriage at a position in the conveyance direction; and a preprocessing head located on the carriage and configured to eject a non-coloring preprocessing solution, a postprocessing head located on the carriage and configured to eject a non-coloring post-ejection solution, wherein each of the plurality of ink head lines includes a plurality of ink heads, wherein the plurality of ink heads is arranged side by side in the main scanning direction and is configured to eject inks for image formation respectively, the postprocessing head is arranged on a downstream side of the plurality of ink head lines in the conveyance direction, at least one of the preprocessing head and the postprocessing head is arranged to be partially interposed between a pair of adjacent ink heads in the main scanning direction among the plurality of ink heads included in at least one ink head line among the plurality of ink head lines, and the preprocessing head is arranged to satisfy a relationship of Formula 1 in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the preprocessing head in the main scanning direction is defined as B1, the plurality of ink head lines are arranged side by side in the conveyance direction, one ink head line among the plurality of ink head lines has one ink head configured to eject ink of a color, other ink head line among the plurality of ink head lines has other ink head arranged adjacent to the one ink head and configured to eject the ink of the color, and in a case where a distance in the main scanning direction from the one-end side head to the postprocessing head is defined as B2, the preprocessing head and the postprocessing head are arranged to satisfy a relationship of Formula 3, $$|(B1-LC/2)|/LC\leq 1/4 \quad \text{(Formula 1)}$$

$$|(B1+B2-LC)/LC|\leq 1/2 \quad \text{(Formula 3).}$$

2. The inkjet recording device according to claim 1, wherein a plurality of the preprocessing heads are arranged side by side in the main scanning direction, and at least one of the plurality of preprocessing heads is arranged to satisfy the relationship of the Formula 1.

3. The inkjet recording device according to claim 2, wherein all of the plurality of preprocessing heads are arranged to satisfy the relationship of the Formula 1.

4. An inkjet recording device, comprising:

a conveyance unit configured to convey a recording medium in a conveyance direction;

a carriage configured to reciprocate in a main scanning direction intersecting the conveyance direction;

a plurality of ink head lines located on the carriage at a position in the conveyance direction; and a preprocessing head located on the carriage and configured to eject a non-coloring preprocessing solution, a postprocessing head located on the carriage and configured to eject a non-coloring post-ejection solution, wherein each of the plurality of ink head lines includes a plurality of ink heads, wherein the plurality of ink heads is arranged side by side in the main scanning direction and is configured to eject inks for image formation respectively, the postprocessing head is arranged on a downstream side of the plurality of ink head lines in the conveyance direction, and at least one of the preprocessing head and the postprocessing head is arranged to be partially interposed between a pair of adjacent ink heads in the main scanning direction among the plurality of ink heads included in at least one ink head line among the plurality of ink head lines, and the postprocessing head is arranged to satisfy a relationship of Formula 2 in a case where among the plurality of ink heads and the processing head, a head arranged closest to one end in the main scanning direction is defined as a one-end side head, a head arranged closest to another end is defined as an other-end side head, a distance from the one-end side head to the other-end side head in the main scanning direction is defined as LC, and a distance from the one-end side head to the postprocessing head in the main scanning direction is defined as B2, the plurality of ink head lines are arranged side by side in the conveyance direction, one ink head line among the plurality of ink head lines has one ink head configured to eject ink of a color, other ink head line among the plurality of ink head lines has other ink head arranged adjacent to the one ink head and configured to eject the ink of the color, and in a case where a distance in the main scanning direction from the one-end side head to the preprocessing head is defined as B1, the preprocessing head is arranged to satisfy a relationship of Formula 3, $$|(B2-LC/2)|/LC\leq 1/4 \quad \text{(Formula 2)}$$

$$|(B1+B2-LC)/LC|\leq 1/2 \quad \text{(Formula 3).}$$

5. The inkjet recording device according to claim 4, wherein a plurality of the postprocessing heads are arranged side by side in the main scanning direction, and at least one of the plurality of postprocessing heads is arranged to satisfy the relationship of the Formula 2.

6. The inkjet recording device according to claim 4, wherein in a case where a distance in the main scanning direction from the one-end side head to the preprocessing head is defined as B1, the preprocessing head is arranged to satisfy a relationship of the following Formula, $$|(B1-LC/2)|/LC\leq 1/4.$$

7. The inkjet recording device according to claim 6, wherein the preprocessing head and the postprocessing head are arranged to satisfy a relationship of the following Formula, $$|(B1+B2-LC)/LC|\leq 1/3.$$

8. The inkjet recording device according to claim 1, wherein the postprocessing head is arranged in a range of an arrangement width of the plurality of ink heads in the main scanning direction.

9. The inkjet recording device according to claim 1, wherein the postprocessing head is arranged in a central region in an arrangement width of the ink head line in the main scanning direction.

10. The inkjet recording device according to claim 1, wherein the preprocessing head and the postprocessing head are arranged such that an arrangement or array center of one or a plurality of the preprocessing heads and an arrangement or array center of one or a plurality of the postprocessing heads in the main scanning direction coincide with each other in the main scanning direction.

11. The inkjet recording device according to claim 1, wherein the inkjet recording device further comprising a holding member configured to hold the carriage in a state of being reciprocable in the main scanning direction, wherein the carriage includes an engagement portion and is held at the holding member in a cantilevered state by the engagement portion, and the preprocessing head is arranged closer to the engagement portion than the postprocessing head in the conveyance direction.

12. The inkjet recording device according to claim 1, wherein the inkjet recording device further comprising: a holding member configured to hold the carriage in a state of being reciprocable in the main scanning direction, wherein the carriage includes an engagement portion and is held at the holding member in a cantilevered state by the engagement portion, and of the preprocessing head and the postprocessing head, a head having a smaller number of the heads is arranged on an engagement portion side of the carriage.

13. The inkjet recording device according to claim 1, further comprising a holding member configured to hold the carriage in a state of being reciprocable in the main scanning direction, wherein the carriage includes an engagement portion and is held at the holding member in a cantilevered state by the engagement portion, and of a head array of the ink heads and the preprocessing head, a head arranged at a side closest to the engagement portion of the carriage is the preprocessing head.

14. The inkjet recording device according to claim 1, further comprising a plurality of ink sub-tanks configured to supply the ink to each of the plurality of ink heads; and a preprocessing solution sub-tank configured to supply the preprocessing solution to the preprocessing head, wherein the plurality of ink sub-tanks is located on the carriage to be aligned in the main scanning direction, and the preprocessing solution sub-tank is located on the carriage at a position different from the plurality of ink sub-tanks in the conveyance direction.

* * * * *